(12) United States Patent
Gaj et al.

(10) Patent No.: US 12,116,312 B2
(45) Date of Patent: Oct. 15, 2024

(54) METHODS AND APPARATUS FOR FORMING AND POLISHING GLASS, GLASS-CERAMIC AND CERAMIC PREFORMS TO FORM SHAPED PLATES FOR LIQUID LENSES

(71) Applicant: CORNING INCORPORATED, Corning, NY (US)

(72) Inventors: Michael Peter Gaj, Horseheads, NY (US); Garrett Andrew Piech, Corning, NY (US); Nickolaos Savidis, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 893 days.

(21) Appl. No.: 17/056,590

(22) PCT Filed: May 20, 2019

(86) PCT No.: PCT/US2019/033092
§ 371 (c)(1),
(2) Date: Nov. 18, 2020

(87) PCT Pub. No.: WO2019/226534
PCT Pub. Date: Nov. 28, 2019

(65) Prior Publication Data
US 2021/0206693 A1    Jul. 8, 2021

Related U.S. Application Data

(60) Provisional application No. 62/674,807, filed on May 22, 2018, provisional application No. 62/824,677, filed on Mar. 27, 2019.

(51) Int. Cl.
*C03C 23/00* (2006.01)
*C03C 15/02* (2006.01)
*G02B 3/14* (2006.01)

(52) U.S. Cl.
CPC .......... *C03C 23/0025* (2013.01); *C03C 15/02* (2013.01); *G02B 3/14* (2013.01)

(58) Field of Classification Search
CPC ..... C03C 23/0025; C03C 15/02; C03C 19/00; G02B 3/14
See application file for complete search history.

(56) References Cited

U.S. PATENT DOCUMENTS

2002/0090493 A1* 7/2002 Kamada .............. C03C 23/0025
428/156
2014/0347741 A1* 11/2014 Karam ................. G02B 26/004
216/26

(Continued)

FOREIGN PATENT DOCUMENTS

WO    2004/008472 A2    1/2004

OTHER PUBLICATIONS

Weingarten, Christian, et al. "Laser polishing and 2PP structuring of inside microfluidic channels in fused silica." Microfluidics and Nanofluidics 21 (2017): 1-9. (Year: 2017).*

(Continued)

*Primary Examiner* — Marin Pichler
*Assistant Examiner* — Justin W. Hustoft
(74) *Attorney, Agent, or Firm* — Yiqun Zhao

(57) ABSTRACT

A liquid lens that includes: a lens body comprising a first window, a second window, and a cavity disposed between the first window and the second window; and a first liquid and a second liquid within the cavity of the lens body, the first liquid and the second liquid substantially immiscible with each other and having different refractive indices such (Continued)

that an interface between the first liquid and second liquid to form a lens. The sidewall of the cavity has an average surface roughness ($R_a$) of less than or equal to 200 nanometers (nm). The cavity is disposed within a plate. Further, each of the windows and the plate comprises a glass, glass-ceramic or ceramic composition. In addition, a linearity of a first bottom portion of the sidewall in proximity to the base of the plate can be from 0 μm±5 μm.

13 Claims, 20 Drawing Sheets

(56) References Cited

U.S. PATENT DOCUMENTS

| | | |
|---|---|---|
| 2015/0070779 A1 | 3/2015 | Karam et al. |
| 2018/0068897 A1* | 3/2018 | Fukuyo ............... C03B 33/082 |

OTHER PUBLICATIONS

Marcune, Victoria, and Iles, Shawn, "Understanding Surface Roughness", Edmund Optics, 2020, https://www.edmundoptics.com/knowledge-center/application-notes/optics/understanding-surface-roughness/ (Year: 2020).*

International Search Report and Written Opinion of the International Searching Authority; PCT/US2019/033084; Mailed Oct. 22, 2019; 11 Pages; European Patent Office.

International Search Report and Written Opinion of the International Searching Authority; PCT/US2019/033092; Mailed Nov. 26, 2019; 17 Pages; European Patent Office.

Jung el al., "Surface polishing of quartz-based microfluidic channels using CO2 laser", Microfluidics and Nanofluidics, vol. 20, No. 6, May 20, 2016, pp. 1-6.

Simsek et al., "CO2 laser polishing of conical shaped optical fiber deflectors", Applied physics b: lasers and optics, vol. 123, No. 6, May 25, 2017, pp. 1-9.

* cited by examiner

METHODS AND APPARATUS FOR FORMING AND POLISHING GLASS, GLASS-CERAMIC AND CERAMIC PREFORMS TO FORM SHAPED PLATES FOR LIQUID LENSES

CROSS-REFERENCE TO RELATED APPLICATIONS

This application claims the benefit of priority under 35 U.S.C. § 371 of International Application No. PCT/US2019/033092, filed on May 20, 2019, which claims the benefit of priority under 35 U.S.C. § 119 of U.S. Provisional Application Ser. No. 62/824,677 filed on Mar. 27, 2019, and U.S. Provisional Application Ser. No. 62/674,807 filed on May 22, 2018, the contents of each of which are relied upon and incorporated herein by reference in their entirety.

FIELD OF THE DISCLOSURE

This disclosure relates to methods and apparatus for grit blasting and laser polishing glass, glass-ceramic and ceramic preforms to form shaped plates for liquid lenses.

BACKGROUND

Liquid lens technologies often rely on conical glass features to center and stabilize the meniscus between two immiscible liquids along the optic axis when voltage is applied. The walls of these features should be smooth as small perturbations can lead to significant changes in the local electric field, which can lead to instabilities in the focusing and other functions of the liquid lens.

Conventional methods to control the smoothness and dimensions of these conical features can be process-intensive, which results in high cost and more susceptibility to yield loss. For example, some forming processes include mechanical polishing and grinding steps, which add to the overall cost of these methods.

SUMMARY OF THE DISCLOSURE

According to some aspects of the present disclosure, a liquid lens is provided that includes: a lens body comprising a first window, a second window, and a cavity disposed between the first window and the second window; and a first liquid and a second liquid within the cavity of the lens body, the first liquid and the second liquid substantially immiscible with each other and having different refractive indices such that an interface between the first liquid and the second liquid forms a lens. The sidewall of the cavity has an average surface roughness ($R_a$) of less than or equal to 20 nanometers (nm). The cavity is disposed within a plate. Further, each of the windows and the plate comprises a glass, glass-ceramic or ceramic composition.

According to some aspects of the present disclosure, a method of polishing a cavity in a plate for a liquid lens is provided that includes: directing a laser beam from a laser against a sidewall of a cavity in a plate. The directing is conducted to polish the sidewall to an average surface roughness ($R_a$) of less than or equal to 20 nanometers (nm). The plate comprises a glass composition. The sidewall of the cavity is further defined by an angle of about 45 degrees to about 90 degrees between the sidewall and a base of the shaped plate. Further, the laser comprises a power of less than 100 W.

According to some aspects of the present disclosure, a method of polishing a cavity in a plate for a liquid lens is provided that includes: directing a laser beam from a laser against a sidewall of a cavity in a plate. The directing is conducted to polish the sidewall to an average surface roughness ($R_a$) of less than or equal to 20 nanometers (nm). The plate comprises a glass composition. The sidewall of the cavity is further defined by an angle of about 45 degrees to about 90 degrees between the sidewall and a base of the shaped plate. Further, the laser comprises a power of less than 100 W. In addition, directing is conducted to polish the sidewall such that a linearity of a first bottom portion of the sidewall in proximity to the base of the shaped plate is from 0 μm to ±5 μm.

According to some aspects of the present disclosure, a method of making a cavity in a plate for a liquid lens is provided that includes: directing a first laser beam from a first laser against a preform to ablate a cavity within the preform and define a shaped plate comprising the cavity; and directing a second laser beam from a second laser against a sidewall of the cavity in the shaped plate. The directing a second laser beam is conducted to polish the sidewall to an average surface roughness ($R_a$) of less than or equal to 20 nanometers (nm). The plate comprises a glass composition. The sidewall of the cavity is further defined by an angle of about 45 degrees to about 90 degrees between the sidewall and a base of the shaped plate. Further, the second laser comprises a power of less than 100 W.

Additional features and advantages will be set forth in the detailed description which follows, and will be readily apparent to those skilled in the art from that description or recognized by practicing the embodiments as described herein, including the detailed description which follows, the claims, as well as the appended drawings.

It is to be understood that both the foregoing general description and the following detailed description describe various embodiments and are intended to provide an overview or framework to understanding the nature and character of the claimed subject matter.

The accompanying drawings are included to provide a further understanding of the various embodiments, and are incorporated into and constitute a part of this specification. The drawings illustrate the various embodiments described herein, and together with the description serve to explain the principles and operation of the claimed subject matter.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

Figure 1:
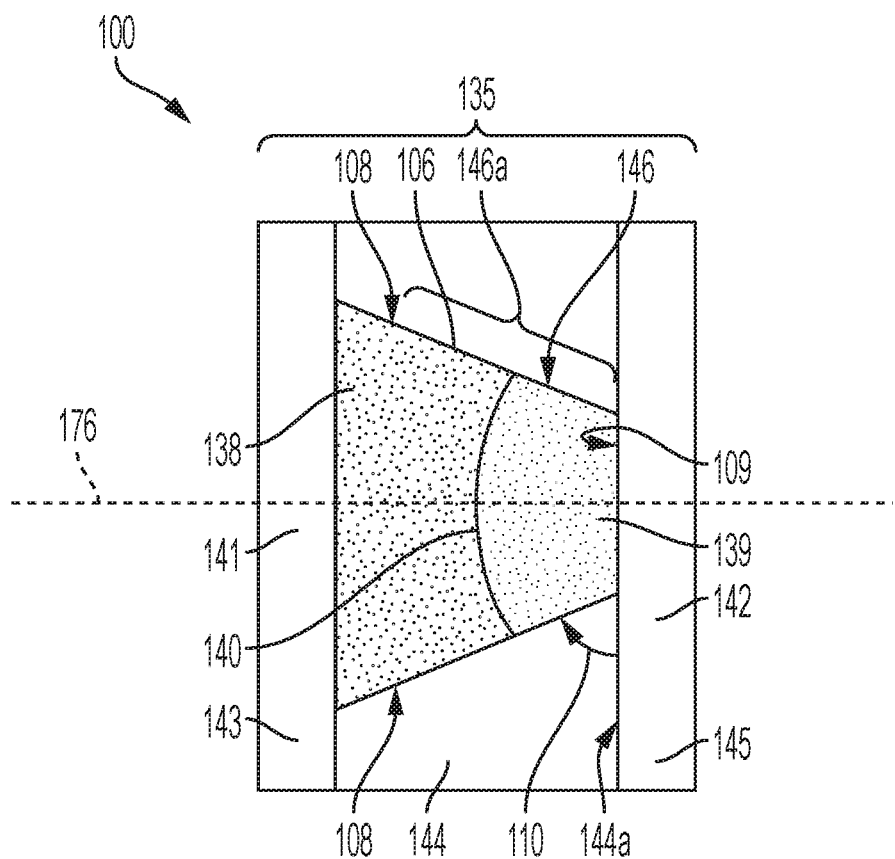
FIG. 1 is a cross-sectional schematic view of embodiments of a liquid lens incorporating a shaped plate.

The foregoing summary, as well as the following detailed description of certain inventive techniques, will be better understood when read in conjunction with the figures. It should be understood that the claims are not limited to the arrangements and instrumentality shown in the figures. Furthermore, the appearance shown in the figures is one of many ornamental appearances that can be employed to achieve the stated functions of the apparatus.

DETAILED DESCRIPTION OF THE PREFERRED EMBODIMENTS

Additional features and advantages will be set forth in the detailed description which follows and will be apparent to those skilled in the art from the description, or recognized by practicing the embodiments as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone: B alone: C alone: A and B in combination: A and C in combination: B and C in combination: or A, B, and C in combination.

In this document, relational terms, such as first and second, top and bottom, and the like, are used solely to distinguish one entity or action from another entity or action, without necessarily requiring or implying any actual such relationship or order between such entities or actions.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

Directional terms as used herein—for example up, down, right, left, front, back, top, bottom—are made only with reference to the figures as drawn and are not intended to imply absolute orientation.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

As used herein, the term "surface roughness" means $R_a$ surface roughness determined as described in ISO 25178, Geometric Product Specifications (GPS)—Surface texture: areal, filtered at 25 μm. As also used herein, the term "average surface roughness" refers to an average of the surface roughness, as determined over a sufficient area or distance of the feature being measured (e.g., the sidewall of a cavity) and sample size to produce a value with statistical significance, as understood according to those with ordinary skill in the field of the disclosure.

As used herein, the term "azimuthal symmetry" refers to the consistency of the shape of the sidewall of an aperture or cavity according to the liquid lens and methods of making these lenses outlined in the disclosure. More particularly, the azimuthal symmetry is measured at any azimuthal location on the sidewall of the cavity. When subtracting the cross sectional wall height at any given radius measured at a first azimuthal slice location from that measured at a second azimuthal slice location, the result across all radii is a maximum value that is less than a maximum deviation (X), where X is reported in microns (μm). For example, a cavity prepared according the methods of the disclosure can exhibit an azimuthal symmetry given by a maximum deviation of 5 μm or less.

Referring to the drawings in general and to FIG. 1, in particular, it will be understood that the illustrations are for the purpose of describing particular embodiments and are not intended to limit the disclosure appended claims thereto. The drawings are not necessarily to scale, and certain features and certain views of the drawings may be shown exaggerated in scale or in schematic form in the interest of clarity and conciseness.

The methods and apparatus described in this disclosure can be used to manufacture shaped plates and articles with smooth cavities formed therein, e.g., smooth cavities and cones in shaped plates for use in liquid lens articles. For example, in various embodiments, the shaped plate or article comprises a plate comprising a glass material, glass-ceramic material, ceramic material, or a combination thereof, and one or more cavities formed in the plate. A sidewall of one or more of these cavities can have a surface roughness ($R_a$) of less than or equal to 200 nanometers (nm), 100 nm, 50 nm, 20 nm, 10 nm, or 1 nm.

The methods and apparatus described in the disclosure can be used to manufacture liquid lenses. For example, in some embodiments, a liquid lens comprises a lens body comprising a first window, a second window, and a cavity disposed between the first window and the second window. A first liquid and a second liquid are disposed within the cavity of the lens body. Further, the first liquid and the second liquid are substantially immiscible with each other and have different refractive indices such that an interface between the first liquid and the second liquid forms a lens. In embodiments, a sidewall of the cavity has a surface roughness ($R_a$) of less than or equal to 200 nm, 100 nm, 50 nm, 20 nm, 10 nm, or 1 nm. In embodiments, the linearity of a bottom portion of the sidewall of the cavity in proximity to the base of the shaped plate is from 0 μm to +5 μm. Further, the cavity is disposed within a plate, and each of the windows and the plate comprises a glass, glass-ceramic or ceramic composition.

In various embodiments, a method of making a cavity in a plate for a liquid lens includes: flowing a first abrasive grit through a nozzle to form a first abrasive jet (e.g., using a carrier gas or a fluid jet). The first abrasive grit comprises an abrasive material having an average particle size from about 1 μm to about 500 μm. The method also includes a step of directing the first abrasive jet against a preform to form a cavity within a shaped plate. The nozzle is spaced from the preform. Further, the preform comprises a glass, glass-ceramic or ceramic composition. The method can, in some embodiments, further include a step of flowing a second abrasive grit through the nozzle to form a second abrasive jet, the second abrasive grit comprising an abrasive material having an average particle size of less than 200 μm; and a step of directing the second abrasive jet against a sidewall of the cavity, the sidewall comprising an average surface roughness ($R_a$) of less than or equal to 200 nm, less than or equal to 100 nm, or less than or equal to 50 nm, after the step of directing the first and/or the second abrasive jet. Additional implementations of the method can, in some embodiments, further include a step of flowing a third abrasive grit through the nozzle to form a third abrasive jet, the third abrasive grit comprising an abrasive material having an average particle size of less than 50 μm; and a step of directing the third abrasive jet against a sidewall of the cavity, the sidewall comprising an average surface roughness ($R_a$) of less than or equal to 100 nm, less than or equal to 50 nm, or less than or equal to 10 nm, after the step of directing the third abrasive jet.

In various embodiments, a method of polishing a cavity in a plate for a liquid lens includes a step of directing a laser beam against a sidewall of a cavity in a plate, wherein the directing is conducted to polish the sidewall to an average surface roughness ($R_a$) of less than or equal to 20 nm, 10 nm, or 1 nm. The plate comprises a glass composition and the laser comprises a power of less than 100 W. Further, the sidewall of the cavity is further defined by an angle of about 45 degrees to about 90 degrees between the sidewall and a base of the shaped plate. In addition, the methods and apparatus described in this disclosure can be used to polish or otherwise manufacture shaped plates and articles with cavities and cones having sidewalls with substantial linearity for use in liquid lens articles. For example, the linearity of a bottom portion of the sidewall of the cavity in proximity to the base of the shaped plate can be from 0 μm to +5 μm.

Referring now to FIG. 1, the methods and apparatus described in the disclosure can be used to manufacture liquid lenses. FIG. 1 is a cross-sectional schematic view of embodiments of a liquid lens 100 incorporating a shaped plate 144. In some embodiments, liquid lens 100 comprises a lens body 135 and a cavity 106 formed in the lens body. A first liquid 138 and a second liquid 139 are disposed within cavity 106. In some embodiments, first liquid 138 is a polar liquid or a conducting liquid. Additionally, or alternatively, second liquid 139 is a non-polar liquid or an insulating liquid. In some embodiments, first liquid 138 and second liquid 139 are immiscible with each other and have different refractive indices such that an interface 140 between the first liquid and the second liquid forms a lens. Interface 140 can be adjusted via electrowetting. For example, a voltage can be applied between first liquid 138 and a surface of cavity 106 (e.g., an electrode positioned near the surface of the cavity and insulated from the first liquid) to increase or decrease the wettability of the surface of the cavity with respect to the first liquid and change the shape of interface 140). In some embodiments, adjusting interface 140 changes the shape of the interface, which changes the focal length or focus of liquid lens 100. For example, such a change of focal length can enable liquid lens 100 to perform an autofocus (AF) function. Additionally, or alternatively, adjusting interface 140 tilts the interface relative to an optical axis 176. For example, such tilting can enable liquid lens 100 to perform an optical image stabilization (OIS) function. Such adjustment of interface 140 via electrowetting can be sensitive to surface roughness and/or non-linearity of the sidewalls of cavity 106. Thus, the methods and apparatus described herein for forming shaped plate 144 having cavities 106 with smooth and/or substantially straight sidewalls may be beneficial for forming cavity 106 for liquid lens 100. In some embodiments, first liquid 138 and second liquid 139 have substantially the same density, which can help to avoid changes in the shape of interface 140 as a result of changing the physical orientation of liquid lens 100 (e.g., as a result of gravitational forces).

In some embodiments, lens body 135 of liquid lens 100 comprises a first window 141 and a second window 142. In some of such embodiments, cavity 106 is disposed between first window 141 and second window 142. In some embodiments, lens body 135 comprises a plurality of layers that cooperatively form the lens body. For example, in the embodiments shown in FIG. 1, lens body 135 comprises a cap 143, a shaped plate 144, and a base 145. In some embodiments, shaped plate 144 with cavity 106 comprises or is otherwise incorporated into a liquid lens 100. For example, shaped plate 144 with cavity 106 is formed as described herein, a cap 143 is bonded to one side (e.g., an object side) of the shaped plate 144, and a base 145 is bonded to the other side (e.g., an image side) of the shaped plate 144 such that the cavity 106 is covered on opposing sides by the cap and the base. Thus, a portion of the cap 143 covering cavity 106 serves as first window 141, and a portion of base 145 covering the cavity 106 serves as second window 142. In other embodiments, the cavity 106 is a blind hole that does not extend entirely through the shaped plate. In such embodiments, the base 145 can be omitted, and the closed end of the cavity 106 can serve as the window.

In some embodiments, cavity 106 has a truncated conical shape as shown in FIG. 1 such that a cross-sectional area of the cavity 106 decreases along optical axis 176 in a direction from the object side to the image side. Such a tapered cavity can help to maintain alignment of interface 140 between first liquid 138 and second liquid 139 along optical axis 176. In other embodiments, the cavity 106 is tapered such that the cross-sectional area of the cavity 106 increases along the optical axis in the direction from the object side to the image side or non-tapered such that the cross-sectional area of the cavity remains substantially constant along the optical axis.

In some embodiments, image light enters liquid lens 100 through first window 141, is refracted at interface 140 between first liquid 138 and second liquid 139, and exits the liquid lens through second window 142. In some embodiments, cap 143 and/or base 145 comprise a sufficient transparency to enable passage of image light. For example, cap 143 and/or base 145 comprise a polymeric material, a glass material, a ceramic material, a glass-ceramic material, or a combination thereof. In some embodiments, outer surfaces of cap 143 and/or base 145 are substantially planar. Thus, even though liquid lens 100 can function as a lens (e.g., by refracting image light passing through interface 140), outer surfaces of the liquid lens can be flat as opposed to being curved like the outer surfaces of a fixed lens. In other embodiments, outer surfaces of the cap and/or the base are curved. Thus, the liquid lens comprises an integrated fixed lens. In some embodiments, shaped plate 144 comprises a glass material, a glass-ceramic material, or a combination thereof as described herein. Because image light can pass through the cavity through shaped plate 144, the shaped plate may or may not be transparent.

Although FIG. 1 illustrates a single liquid lens 100, liquid lenses can be manufactured in arrays (not shown) using a wafer manufacturing process as described herein. For example, a liquid lens array comprises a plurality of liquid lenses 100 attached in a plate or wafer. Thus, prior to singulation to form single liquid lens 100, shaped plate 144 comprises a plurality of cavities 106. Additionally, or alternatively, prior to singulation, cap 143 comprises a plate with a plurality of first windows 141 corresponding to the plurality of cavities 106. Additionally, or alternatively, prior to singulation, base 145 comprises a plate with a plurality of second windows 142 corresponding to the plurality of cavities 106. After formation, the liquid lens array can be singulated to form the individual liquid lenses 100.

Referring again to FIG. 1, a liquid lens 100 is provided that includes: a lens body 135 comprising a first window 141, a second window 142, and a cavity 106 disposed between the first window and the second window; and a first liquid 138 and a second liquid 139 within the cavity 106 of the lens body 125, the first liquid 138 and the second liquid 139 substantially immiscible with each other and having different refractive indices such that an interface 140 between the first liquid and second liquid to form a lens 100. The sidewall 108 of the cavity 106 has an average surface roughness ($R_a$) of less than or equal to 10 nanometers (nm). The cavity 106 is disposed within a shaped plate 144. Further, each of the windows 141, 142 and the plate 144 comprises a glass, glass-ceramic or ceramic composition. According to embodiments of the liquid lens 100, the shaped plate 144 has a thickness that ranges from about 100 μm to about 2 mm, from about 300 μm to about 1.5 mm and all thickness values between these ranges. In some aspects, the plate 144 includes one or more portions comprising a glass composition, glass-ceramic or ceramic composition. According to some embodiments, the shaped plate 144 is fabricated from a glass composition. The glass composition employed by the shaped plate 144 can, in some implementations, be characterized by a coefficient of thermal expansion (CTE) that ranges from $0.5 \times 10^{-6}/°$ K to $10 \times 10^{-6}/°$ K. In some implementations, the CTE of the glass employed in the shaped plate 144 can range from $3 \times 10^{-6}/°$ K to $10 \times 10^{-6}/°$ K. In other implementations, the liquid lens 100 employs a shaped plate 144 made from a higher CTE glass composition that ranges from about $7 \times 10^{-6}/°$ K to about $10 \times 10^{-6}/°$ K.

In embodiments, the liquid lens 100 depicted in FIG. 1 includes a cavity 106 having a sidewall 108 with an average surface roughness ($R_a$) of less than or equal to 200 nm, 100 nm, 50 nm, 40 nm, 30 nm, or even less than or equal to 20 nm. According to some implementations, the average surface roughness ($R_a$) of the sidewall 108 is less than or equal to 20 nm, 19 nm, 18 nm, 17 nm, 16 nm, 15 nm, 14 nm, 13 nm, 12 nm, 11 nm, 10 nm, 9 nm, 8 nm, 7 nm, 6 nm, 5 nm, 4 nm, 3 nm, 2 nm, 1 nm, and all values between these surface roughness values. Further, the length of the sidewall 108 of the cavity 106 can range from about 250 µm to about 3000 µm, preferably greater than or equal to about 600 µm.

In embodiments, the liquid lens shown in FIG. 1 includes a cavity 106 having a sidewall 108 with substantial linearity. For example, as shown in FIG. 1, a first bottom portion 146 of the sidewall 108 in proximity to the base 144a of the shaped plate 144 can have a linearity from 0 µm to +10 µm, 0 µm to +7.5 µm, 0 µm to +5 µm, or even 0 µm to #2.5 µm. That is, the first bottom portion 146 of the sidewall 108 is substantially linear. According to some embodiments, as shown in FIG. 1, the first bottom portion 146 of the sidewall 108 can extend from the base 144a of the shaped plate 144 to a first bottom portion length 146a. In some embodiments, the first bottom portion length 146a can be up to 80% of the total length of sidewall 108 (e.g., from 250 µm to 3000 µm). In other embodiments, the first bottom portion length 146a can extend to a position within 2000 µm, 1750 µm, 1500 µm, 1250 µm, 1000 µm, 750 µm, 500 µm, 250 µm, or any position between these values, from the base 144a. Hence, the first bottom portion length 146a can have a length of about 2000 µm, 1750 µm, 1500 µm, 1250 µm, 1000 µm, 750 µm, 500 µm, 250 µm, or any length values between these lengths. As used herein, a "linearity" of 0 µm is indicative of ideal or perfect linearity, as would be understood by those of ordinary skill in the field of the disclosure. Further, unless otherwise noted, "linearity" denotes the linearity of the specified surface or length (e.g., the first bottom portion length 146a).

Referring again to the liquid lens 100 shown in FIG. 1, the cavity 106 within the shaped plate 144 is depicted in a truncated conical shape. In other aspects, the cavity 106 can take on various other shapes suitable for functioning as a cavity 106 that holds two immiscible liquids in a liquid lens arrangement including, but not limited to, shapes with rotational symmetry such as cylindrical, toroidal, and conical shapes. The cavity 106 can also take on various shapes with non-rotational symmetry that can function to hold two immiscible liquids in a liquid lens arrangement including but not limited to substantially cylindrical, toroidal and conical shapes with substantially rectangular, square and triangular cross-sections (i.e., as parallel to the primary plane of the shaped plate 144). Further, for a cavity 106 with a conical shape, the sidewall 108 of the cavity 106 can be further defined by an angle 110 between the sidewall 108 and a base 144a of the shaped plate 144 (see FIG. 1). In embodiments, the angle 110 can range from about 45 degrees to about 90 degrees, e.g., 45 degrees, 50 degrees, 55 degrees, 60 degrees, 65 degrees, 70 degrees, 75 degrees, 80 degrees, 85 degrees, 90 degrees and all angles between these orientations. In some implementations, the angle 110 is about 60 degrees. Further, the cavity 106 can have an outer diameter from about 0.5 mm to about 5 mm.

Still referring to the liquid lens 100 shown in FIG. 1, the cavity 106 within the shaped plate 144 can have a strong azimuthal symmetry, in which the shape of its sidewall 108 is substantially consistent at each location rotating around the cavity 106 about the axis 176. In some implementations, the cavity 106 can be characterized by an azimuthal symmetry with a maximum deviation (X) of up to 5 µm. In other embodiments, the cavity 106 can be characterized by an azimuthal symmetry with a maximum deviation (X) of up to 5 µm, 4.5 µm, 4 µm, 3.5 µm, 3 µm, 2.5 µm, 2 µm, 1.5 µm, 1 µm, 0.5 µm, and all azimuthal symmetry maximum deviation (X) values between these levels.

Figure 2:
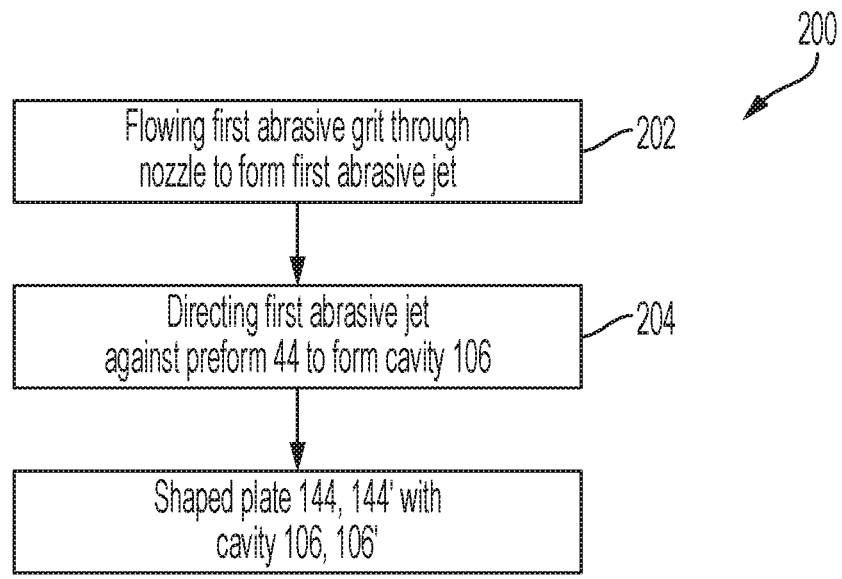
FIGS. 2-2B are schematic flow charts of embodiments of grit blasting methods of making and/or polishing a cavity in a plate for a liquid lens.

Referring now to FIG. 2, a method 200 of making a cavity 106, 106' in a shaped plate 144, 144' for a liquid lens 100 is depicted in schematic form. Embodiments of the method 200 produce a cavity 106 of a shaped plate 144 which exists in final form, e.g., with sidewalls 108 having a desired level of surface roughness ($R_a$). Accordingly, embodiments of the method 200 are aimed at producing a cavity for a liquid lens with a sufficiently low level of surface roughness for the desired liquid lens application, without the need for additional processing (e.g., grinding and polishing). Other embodiments of the method 200 produce a cavity 106' of a shaped plate 144' which exists in an interim form, e.g., with sidewalls 108 having a degree of surface roughness ($R_a$) (e.g., a surface roughness (Ra) from 200 nm to 10 µm) that may benefit from an additional process or steps to further refine the surface roughness ($R_a$) (e.g., the method 700 of polishing a cavity depicted in FIG. 7 and described in further detail below). Accordingly, embodiments of the method 200 are aimed at producing a cavity for a liquid lens that is subjected to additional polishing to achieve the desired degree of surface roughness for the application.

Referring again to FIG. 2, the method 200 includes a step 202 of flowing a first abrasive grit through a nozzle to form a first abrasive jet. In implementations, the first abrasive grit is flowed through the nozzle in a substantially inert gas (e.g., ambient air, argon, nitrogen, helium, etc.). The first abrasive grit can include an abrasive material having an average particle size from about 1 µm to about 500 µm (e.g., 17.5 µm $Al_2O_3$ grit). For example, the abrasive material of the first abrasive grit can be characterized with an average particle size of 1 µm, 5 µm, 10 µm, 50 µm, 100 µm, 200 µm, 300 µm, 400 µm, 500 µm, and all average particle sizes between these values. The method 200 also includes a step 204 of directing the first abrasive jet against a preform 44. Further, according to the method 200, the nozzle is spaced from the preform 44, e.g., at a distance sufficient to allow the formation of the first abrasive jet with a diameter to form the cavity 106, 106' in the preform 44.

Upon completion of step 204 of the method 200 depicted in FIG. 2, the preform 44 is formed into shaped plate 144, 144' having a cavity 106, 106'. Accordingly, the cavity 106 of the shaped plate 144 produced according to the method 200 can be characterized by a surface roughness ($R_a$) of less than or equal to 200 nm. According to some implementations, the average surface roughness ($R_a$) of the sidewall 108 of the cavity 106 produced according to the method 200 is less than or equal to 200 nm, 175 nm, 150 nm, 125 nm, 100 nm, 75 nm, 50 nm, 25 nm, 20 nm, 15 nm, 10 nm, 5 nm, 1 nm, and all values between these surface roughness values.

Referring again to the method 200 depicted in FIG. 2, the preform 44 can be made from a glass, glass-ceramic or ceramic composition. In some aspects, the preform 44 includes one or more portions comprising a glass composition, glass-ceramic or ceramic composition. According to some embodiments, the preform 44 is fabricated from a glass composition. The glass composition employed by the preform 44 can, in some implementations, be characterized by a coefficient of thermal expansion (CTE) that ranges from $0.5 \times 10^{-6}/°$ K to $10 \times 10^{-6}/°$ K. In some implementations, the CTE of the glass employed in the preform 44 can range from $3 \times 10^{-6}/°$ K to $10 \times 10^{-6}/°$ K. In other implementations, the method 200 employs a preform 44 made from a higher CTE glass composition that ranges from about $7 \times 10^{-6}/°$ K to about $10 \times 10^{-6}/°$ K.

Figure 2A:
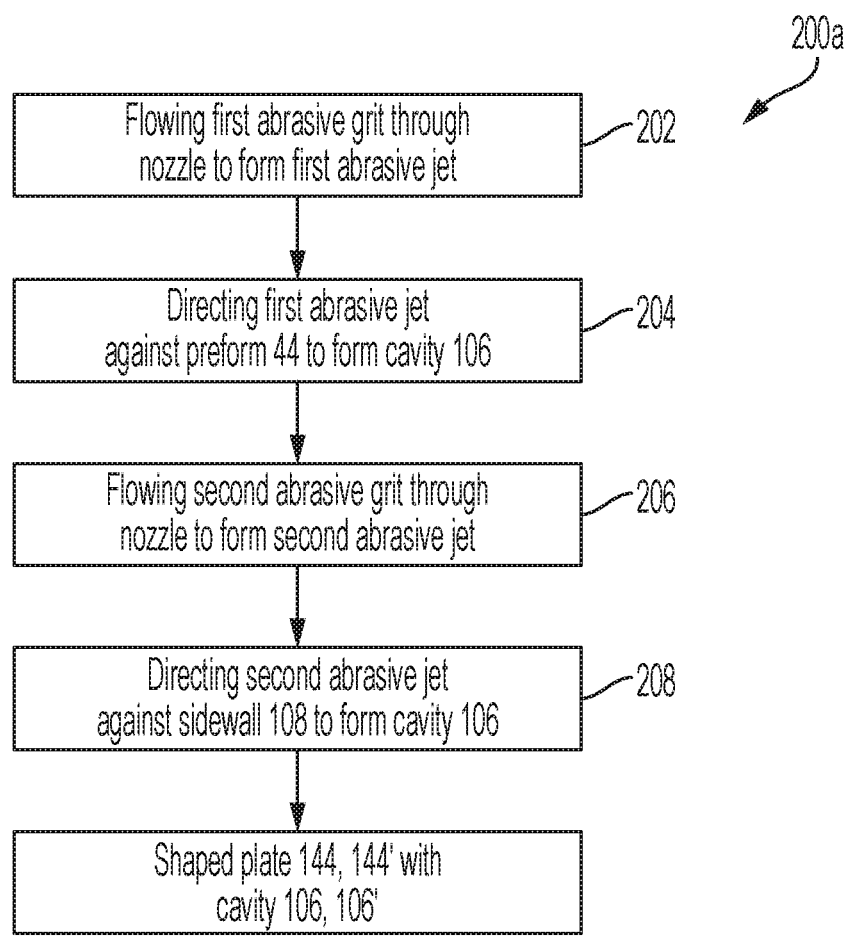

Referring now to FIG. 2A, a method 200a of making a cavity 106 in a shaped plate 144 for a liquid lens 100 is depicted in schematic form. Embodiments of the method 200a produce a cavity 106 of a shaped plate 144 which exists in final form, e.g., with sidewalls 108 having a desired level of surface roughness ($R_a$). Accordingly, embodiments of the method 200a are aimed at producing a cavity for a liquid lens with a sufficiently low level of surface roughness for the desired liquid lens application, without the need for additional processing. Other embodiments of the method 200a produce a cavity 106' of a shaped plate 144' which exists in an interim form, e.g., with sidewalls 108 having a degree of surface roughness ($R_a$) that may benefit from an additional process or steps to further refine the surface roughness ($R_a$). Accordingly, embodiments of the method 200a are aimed at producing a cavity for a liquid lens that may benefit from additional polishing to achieve the desired degree of surface roughness for the application.

Referring again to FIG. 2A, the method 200a includes a step 202 of flowing a first abrasive grit through a nozzle to form a first abrasive jet. The first abrasive grit can include an abrasive material having an average particle size from about 1 µm to about 500 µm. The method 200a also includes a step 204 of directing the first abrasive jet against a preform 44. Upon completion of step 204, the preform 44 is formed into shaped plate 144, 144' having a cavity 106, 106'. Further, according to the method 200a, the nozzle is spaced from the preform 44, e.g., at a distance sufficient to allow the formation of the first abrasive jet with a diameter to form the cavity 106, 106' in the preform 44. Further, the method 200a includes a step 206 for flowing a second abrasive grit through the nozzle to form a second abrasive jet. In implementations, the second abrasive grit is flowed through the nozzle in a substantially inert gas (e.g., ambient air, argon, nitrogen, helium, etc.) and/or with water or other inert liquid. The second abrasive grit can include an abrasive material having an average particle size of less than 200 µm, less than 100 µm, less than 50 µm, or less than 10 µm. (e.g., ~0.9 µm $Al_2O_3$ grit). For example, the abrasive material of the second abrasive grit employed in the method 200a can be characterized with an average particle size of 1 µm, 5 µm, 10 µm, 50 µm, 100 µm, 200 µm, and all average particle sizes between these values. The method 200a also includes a step 208 of directing the second abrasive jet against a sidewall 108 to form or otherwise further polish the cavity 106. Further, according to the method 200a, the nozzle is spaced from the preform 44, e.g., at a distance sufficient to allow the formation of the first abrasive jet with a diameter to form the cavity 106, 106' in the preform 44.

Upon completion of step 208 of the method 200a, the preform 44 is formed into shaped plate 144, 144' having a cavity 106, 106'. Accordingly, the cavity 106 of the shaped plate 144 produced according to the method 200a can be characterized by a surface roughness ($R_a$) of less than or equal to 200 nm, less than or equal to 100 nm, or less than or equal to 50 nm. According to some implementations, the average surface roughness ($R_a$) of the sidewall 108 of the cavity 106 produced according to the method 200a is less or equal to 200 nm, 150 nm, 100 nm, 75 nm, 50 nm, 25 nm, 20 nm, 15 nm, 10 nm, 5 nm, 1 nm, and all values between these surface roughness values.

Figure 2B:
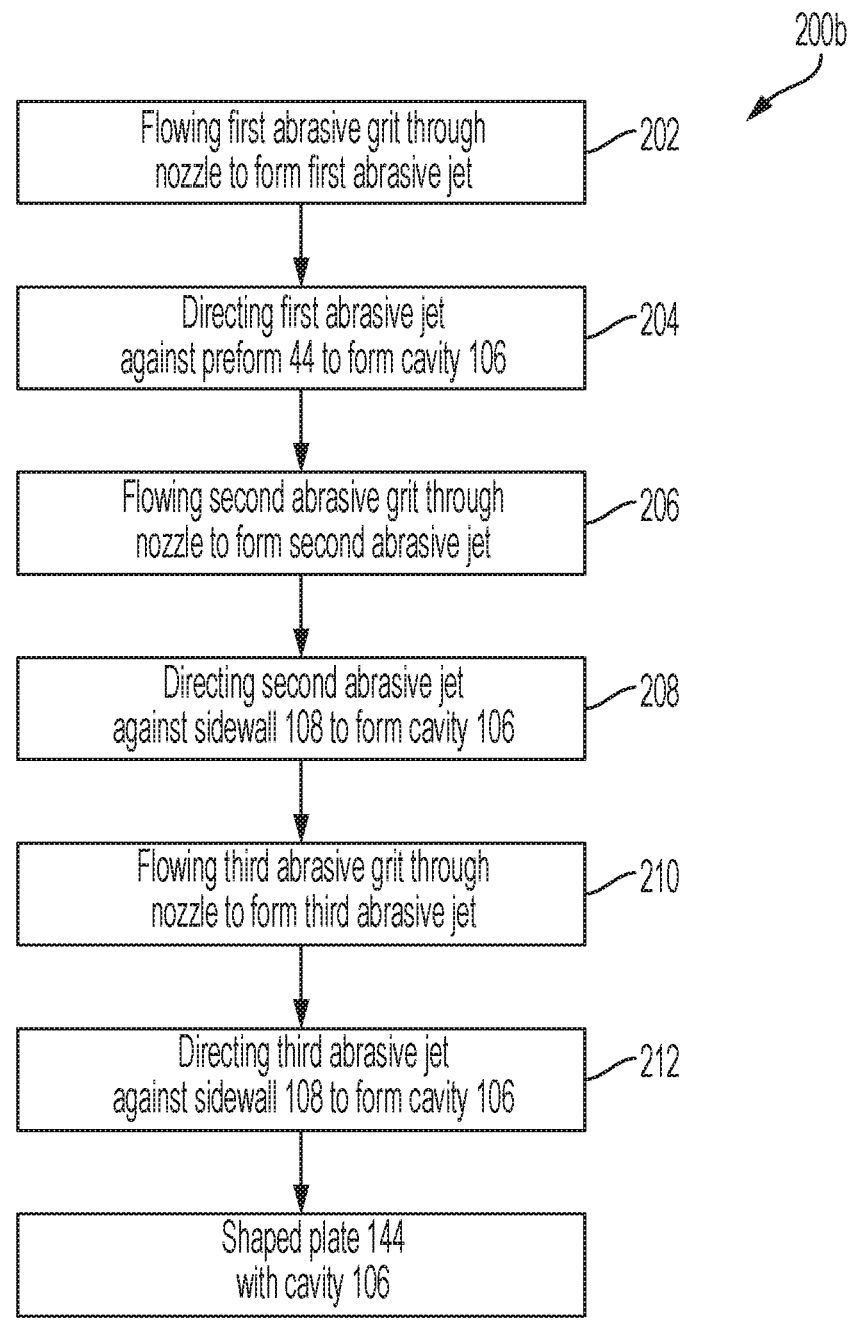

Referring now to FIG. 2B, a method 200b of making a cavity 106 in a shaped plate 144 for a liquid lens 100 is depicted in schematic form. Embodiments of the method 200b produce a cavity 106 of a shaped plate 144 which exists in final form, e.g., with sidewalls 108 having a desired level of surface roughness ($R_a$). Accordingly, embodiments of the method 200b are aimed at producing a cavity for a liquid lens with a sufficiently low level of surface roughness for the desired liquid lens application, without the need for additional processing.

Referring again to FIG. 2B, the method 200b includes a step 202 of flowing a first abrasive grit through a nozzle to form a first abrasive jet. The first abrasive grit can include an abrasive material having an average particle size from about 1 µm to about 500 µm. The method 200b also includes a step 204 of directing the first abrasive jet against a preform 44. Upon completion of step 204, the preform 44 is formed into shaped plate 144, 144 having a cavity 106, 106'. Further, according to the method 200b, the nozzle is spaced from the preform 44, e.g., at a distance sufficient to allow the formation of the first abrasive jet with a diameter to form the cavity 106, 106' in the preform 44. Further, the method 200b includes a step 206 for flowing a second abrasive grit through the nozzle to form a second abrasive jet. In implementations, the second abrasive grit is flowed through the nozzle in a substantially inert gas (e.g., ambient air, argon, nitrogen, helium, etc.) and/or with water or other inert liquid. The second abrasive grit can include an abrasive material having an average particle size of less than 200 µm. For example, the abrasive material of the second abrasive grit employed in the method 200b can be characterized with an average particle size of 1 µm, 5 µm, 10 µm, 50 µm, 100 µm, 200 µm, and all average particle sizes between these values. The second abrasive grit can include an abrasive material having an average particle size that is less than the average particle size of the first abrasive grit. Alternatively, the second abrasive grit can include an abrasive material having an average particle size that is greater than the average particle size of the first abrasive grit. The method 200b also includes a step 208 of directing the second abrasive jet against a sidewall 108 to form or otherwise further polish the cavity 106.

Further, the method 200b includes a step 210 for flowing a third abrasive grit through the nozzle to form a third abrasive jet. In implementations, the third abrasive grit is flowed through the nozzle in a substantially inert gas (e.g., ambient air, argon, nitrogen, helium, etc.) and/or with water or other inert liquid. The third abrasive grit can include an abrasive material having an average particle size of less than 50 µm, less than 10 µm, or less than 1 µm (e.g., ~0.1 µm $Al_2O_3$ grit). For example, the abrasive material of the third abrasive grit employed in the method 200b can be characterized with an average particle size of 1 µm, 5 µm, 10 µm, 15 µm, 20 µm, 25 µm, 30 µm, 35 µm, 40 µm, 45 µm, 50 µm, and all average particle sizes between these values. The third abrasive grit can include an abrasive material having an average particle size that is less than the average particle size of the first abrasive grit and/or the second abrasive grit. Alternatively, the third abrasive grit can include an abrasive material having an average particle size that is greater than the average particle size of the first abrasive grit and/or the second abrasive grit. The method 200b also includes a step 212 of directing the third abrasive jet against a sidewall 108 to form or otherwise further polish the cavity 106. Further, according to the method 200b, the nozzle is spaced from the preform 44, e.g., at a distance sufficient to allow the formation of the first abrasive jet with a diameter to form the cavity 106, 106' in the preform 44.

Upon completion of step 212 of the method 200b, the preform 44 is formed into a shaped plate 144 having a cavity 106. Accordingly, the cavity 106 of the shaped plate 144 produced according to the method 200b can be characterized by a surface roughness ($R_a$) of less than or equal to 100 nm, less than or equal to 50 nm, or less than or equal to 10 nm.

According to some implementations, the average surface roughness ($R_a$) of the sidewall 108 of the cavity 106 produced according to the method 200b is less or equal to 100 nm, 75 nm, 50 nm, 40 nm, 30 nm, 20 nm, 15 nm, 10 nm, 9 nm, 8 nm, 7 nm, 6 nm, 5 nm, 4 nm, 3 nm, 2 nm, 1 nm, and all values between these surface roughness values.

Figure 3:
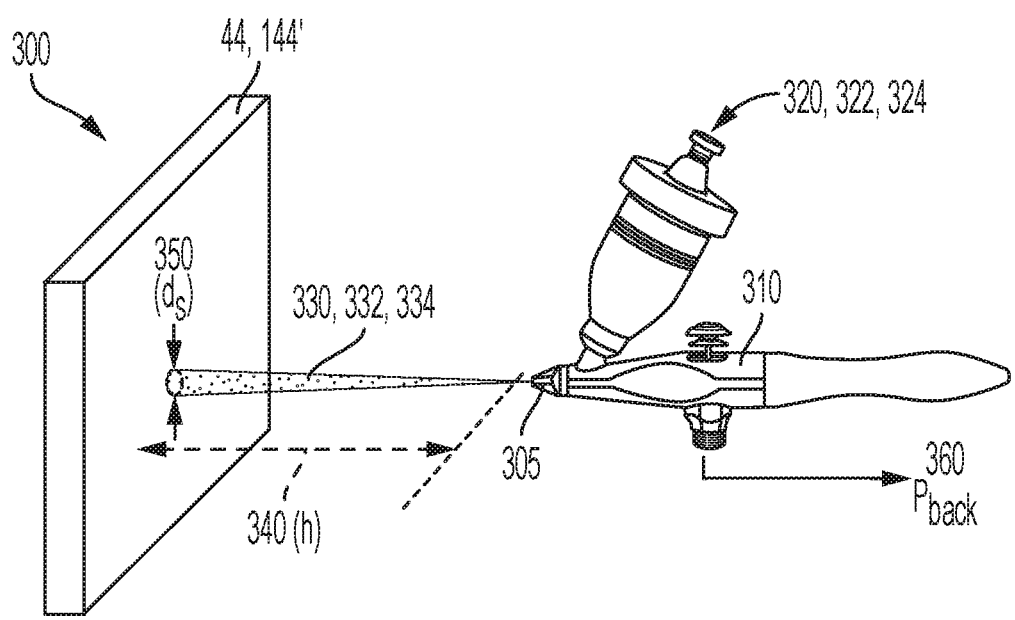
FIG. 3 is a schematic of a grit blasting apparatus for making and/or polishing a cavity in a plate for a liquid lens, according to an embodiment.

Referring now to FIG. 3, a grit blasting apparatus 300 is depicted in schematic form. According to embodiments, the grit blasting apparatus 300 can be employed in making and/or polishing a cavity 106, 106' in a shaped plate 144, 144' for use in a liquid lens 100 (see FIG. 1). Further, the methods 200-200b depicted in FIGS. 2-2B can employ the apparatus 300 for making and/or polishing these cavities in shaped plates. As shown in FIG. 3, a grit blaster 310 can be employed to direct any one or more of first, second, and third abrasive materials 320, 322, 324 through the nozzle 305 to form respective first, second and third abrasive jets 330, 332, 334. Further, the abrasive materials 320, 322, 334 and any others employed in the grit blasting apparatus 300 and/or methods 200-200b can include $SiO_2$, $Al_2O_3$, SiC, $Si_3N_4$, other grit materials suitable for grit blasting glass, glass-ceramic and ceramic materials as understood by those of ordinary skill in the field of the disclosure, and combinations thereof. The abrasive jets 330, 332 and 334 are directed through the nozzle 305 at a backpressure 360 ($P_{back}$) to develop a spot size 350 ($d_s$) at a distance 340) (h) between the nozzle 305 and the preform 44 or shaped plate 144'. These jets 330, 332, 334 are then directed against a preform 44 (or shaped plate 144) to form a cavity 106, 106' (not shown). As would be understood by those with ordinary skill in the field of the disclosure, the grit blasting apparatus 300 can employ additional abrasive materials, besides first, second, third abrasive materials 320, 322 and 324 to form other abrasive jets (not shown). Similarly, various nozzles 305, distances 340) (h) and backpressures 360) ($P_{back}$) can be employed to produce varying spot sizes 350) ($d_s$) and other levels of surface roughness in the resulting cavity 106 of the shaped plate 144.

Referring again to FIGS. 2-2B and FIG. 3, the methods 200-200b can employ the grit blasting apparatus 300 to achieve various shapes, surface roughness and other morphologies associated with the cavity 106 of the shaped plate 144. According to implementations of methods 200-200b, the nozzle 305 can be set at a distance 340) (h) that ranges from about 0.5 mm to about 50 mm. In embodiments, the distanced 340) (h) is set between about 0.5 mm and about 35 mm, or between 0.5 mm and about 25 mm. Further, in some embodiments of the grit blasting apparatus 300 employed in these methods, the orifice size of the nozzle 305 can range from 10 µm to about 5 mm, or from about 0.1 mm to about 5 mm. Further, the backpressure 360) ($P_{back}$) can range from about 5 psi to about 500 psi, from about 25 psi to about 500 psi, or from about 5 psi to about 60 ksi, depending on the abrasive material(s) and the medium (e.g., air, water, etc.) in which it is deployed through the nozzle 305.

According to embodiments of the methods 200-200b and the grit blasting apparatus 300 depicted in FIGS. 2-2B and 3, step 202 of flowing a first abrasive grit through the nozzle 305 to form a first abrasive jet 330 can be conducted in air with a backpressure 360 ($P_{back}$) from about 25 psi to about 500 psi. Further, the step 204 of directing the first abrasive jet 330 against the preform 44 can be conducted such that the nozzle 305 is spaced at a distance 340 (h) from the preform 44 from about 1 mm to about 35 mm. As such, these steps can be conducted at relatively low backpressures (<~500 psi) given the additional safety requirements of operating in an air other gas medium to minimize particle safety inhalation concerns.

According to embodiments of the methods 200-200b and the grit blasting apparatus 300 depicted in FIGS. 2-2B and 3, steps 206 and/or 210 of flowing abrasive grit 322, 324 through the nozzle 305 to form abrasive jets 332, 334 can be conducted in a water or other inert liquid medium with a backpressure 360 ($P_{back}$) from about 0.5 ksi to about 60 ksi, from about 1 ksi to about 60 ksi, or from about 10 ksi to about 60 ksi. Further, the steps 208, 212 of directing the abrasive jets 332, 334 against the preform 44 or shaped plate 144' can be conducted such that the nozzle 305 is spaced at a distance 340 (h) from the preform 44 from about 0.5 mm to about 25 mm. As such, these steps can be conducted at relatively high backpressures (>500 psi) given the use of a water or other liquid medium with the abrasive material, which can minimize particle inhalation safety concerns.

Figure 4A:
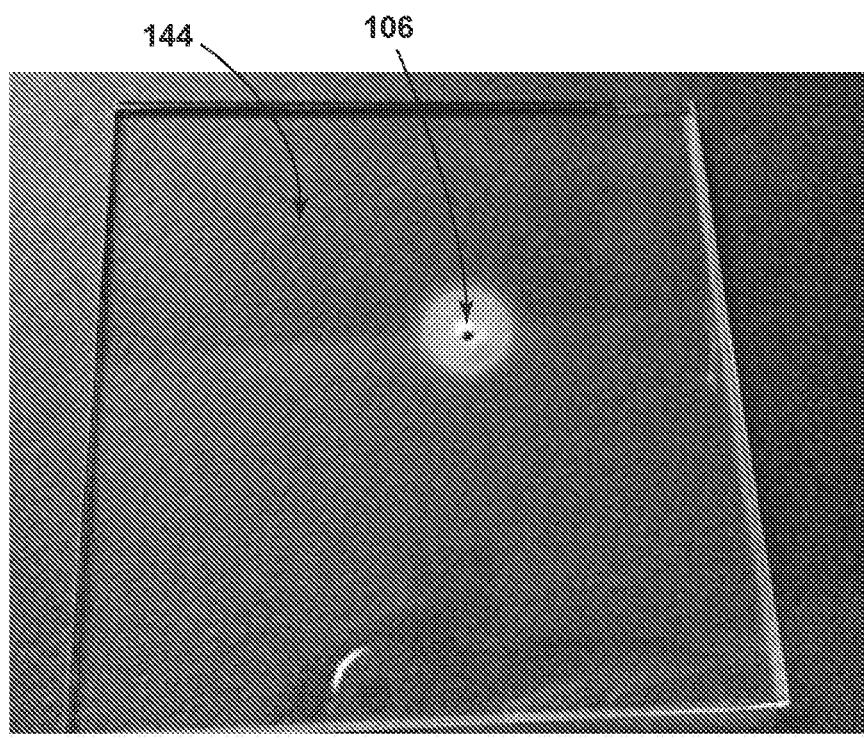
FIG. 4A is a top view photograph of a cavity in a plate formed with a grit blasting method according to an embodiment.
Figure 4B:
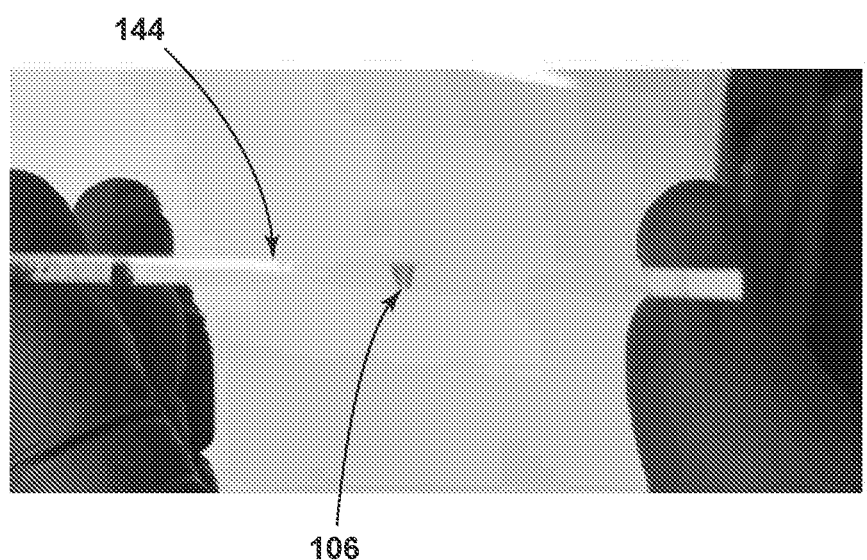
FIG. 4B is a side view photograph of the cavity in a plate depicted in FIG. 4A.

Referring now to FIGS. 4A and 4B, respective top view and side view photographs of a cavity 106 in a shaped plate 144 are depicted. In particle, the cavity 106 in the shaped plate 144 was formed according to a grit blasting method and grit blasting apparatus (i.e., a Comco, Inc. AccuFlo® Microblaster) comparable to the respective method 200 and apparatus 300 depicted in FIGS. 2 and 3. In particular, the method was conducted with a first abrasive material comprising $Al_2O_3$ grit having an average particle size of about 17.5 µm, a backpressure ($P_{back}$) of about 80 psi, a distance between the nozzle and preform of about ⅞", and a nozzle diameter of 0.5 mm. The preform was fabricated from Corning® Iris® glass and had a thickness of 2 mm. Further, the grit blasting was conducted according to the method 200 for a duration of about 90 seconds. As is evident from FIGS. 4A and 4B, a cavity 106 with a conical shape was produced with qualitatively low surface roughness in the shaped plate 144 according to the method, apparatus and foregoing parameters.

Figure 5A:
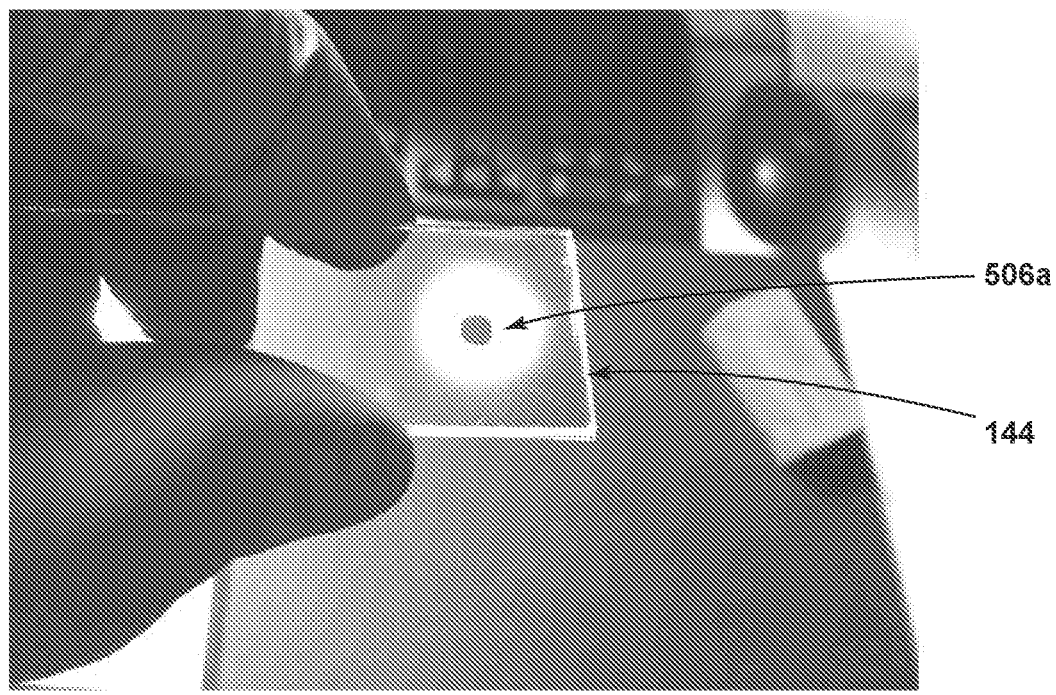
FIG. 5A is a top view photograph of a non-rotationally symmetric cavity in a plate formed with a grit blasting method according to an embodiment.
Figure 5B:
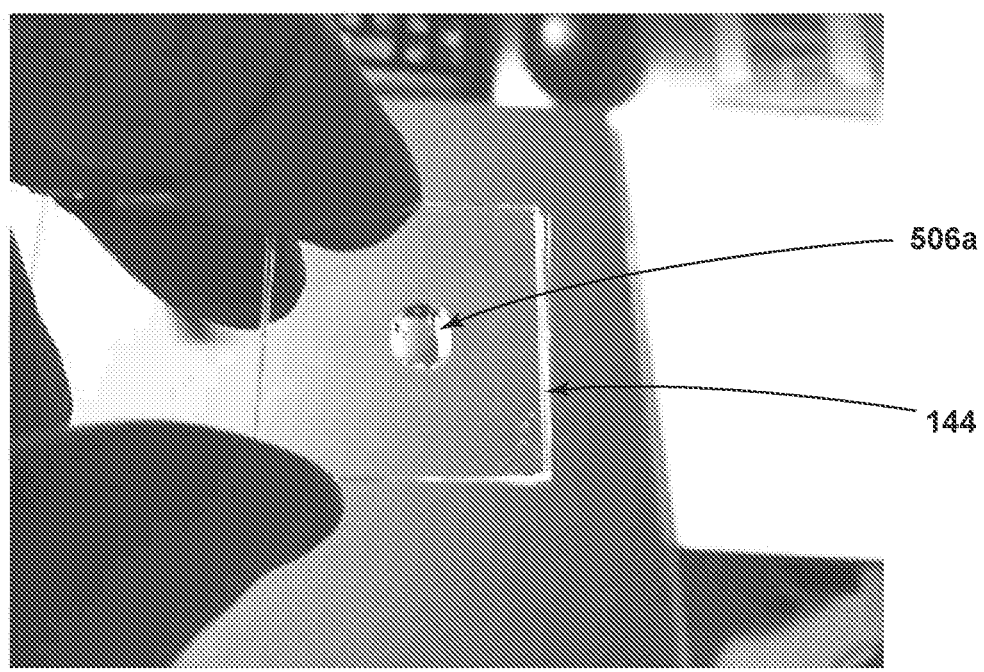
FIG. 5B is a top view of the cavity in a plate depicted in FIG. 5A, as index-matched with water, according to an embodiment.

Referring now to FIGS. 5A and 5B, top view photographs of a non-rotationally symmetric cavity 506a within a shaped plate 144 are depicted, with and without index-matching water within the cavity, respectively. In particular, the cavity 506a in the shaped plate 144 was formed according to a grit blasting method and grit blasting apparatus (i.e., a Comco, Inc. AccuFlo® Microblaster) comparable to the respective method 200 and apparatus 300 depicted in FIGS. 2 and 3. In particular, the method was conducted with a first abrasive material comprising $Al_2O_3$ grit having an average particle size of about 17.5 µm, a backpressure ($P_{back}$) of about 80 psi, a distance between the nozzle and preform of about ⅞", and a nozzle diameter of 0.5 mm. The preform was fabricated from Corning® Iris® glass and had a thickness of 2 mm. Further, the grit blasting was conducted according to the method 200 for a duration of about 90 seconds at each of a plurality of locations on the preform. As is evident from FIGS. 5A and 5B, a non-rotationally symmetric cavity 506a with a conical shape and a rectangular cross-section was produced with qualitatively low surface roughness in the shaped plate 144 according to the method, apparatus and foregoing parameters.

Figure 6:
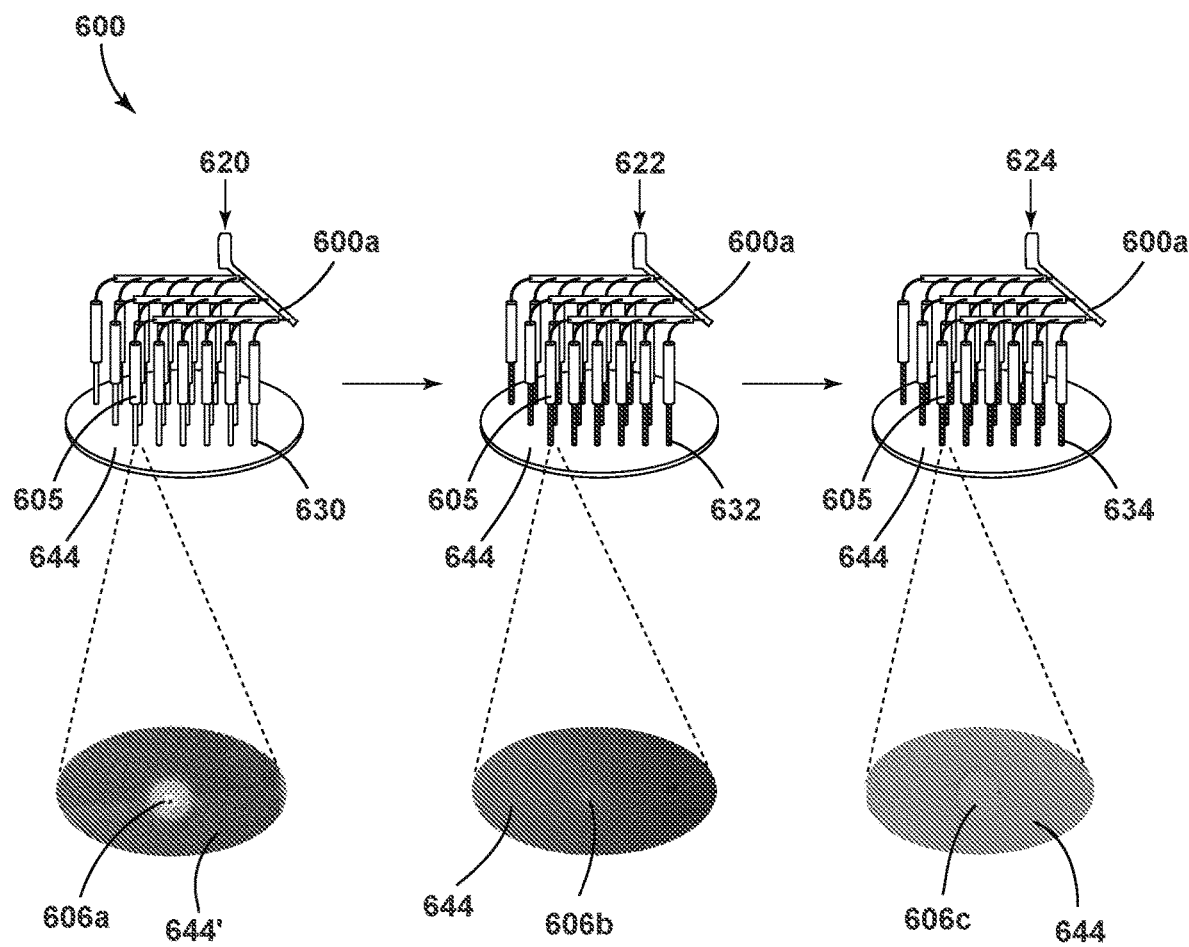
FIG. 6 is a schematic of grit blasting apparatus for making and/or polishing a cavity in plate, as scaled for higher volume manufacturing, according to an embodiment.

Referring now to FIG. 6, a schematic of grit blasting apparatus 600 is provided, which is substantially similar to the grit blasting apparatus 300 (see FIG. 3), but scaled for higher volume manufacturing, according to an embodiment. In particular, the grit blasting apparatus 600 can be employed for making and/or polishing multiple cavities 606a-606c in preforms 644' or shaped plates 644 for use in liquid lens 100 devices (see FIG. 1). The grit blasting apparatus 600 can also be employed in making and/or polishing a cavity 106, 106' in a shaped plate 144, 144' for use in a liquid lens 100 (see FIG. 1). Further, the methods 200-200b depicted in FIGS. 2-2B can employ the apparatus 600 for making and/or polishing these cavities in shaped plates. As shown in FIG. 6, a grit blaster 600a can be employed to direct any one or more of first, second, and third abrasive materials 620, 622, 624 through an array of nozzles 605 to form respective first, second and third abrasive jets 630, 632, 634. Further, the abrasive materials 620, 622, 634 and any others employed in the grit blasting apparatus 600 and/or methods 200-200b can include $SiO_2$, $Al_2O_3$, SiC, $Si_3N_4$, other grit materials suitable for grit blasting glass, glass-ceramic and ceramic materials as understood by those of ordinary skill in the field of the disclosure, and combinations thereof. The abrasive jets 630, 632 and 634 are directed through the nozzles 605 at a backpressure to develop a spot size ($d_s$) at a distance (h) (not shown in FIG. 6) between the nozzles 605 and the preform 644' or shaped plate 644. These jets 630, 632, 634 are then directed against a preform 644' (or shaped plate 644) to form a cavity 606a, 606b, or 606c. As would be understood by those with ordinary skill in the field of the disclosure, the grit blasting apparatus 600 can employ additional abrasive materials, besides first, second, third abrasive materials 620, 622 and 624 to form other abrasive jets (not shown). Similarly, various nozzles 605, distances (h) and backpressures ($P_{back}$) can be employed to produce varying spot sizes ($d_s$) and other levels of surface roughness in the resulting cavity 606a-c of the preforms 644' and/or shaped plate 644.

Figure 7:
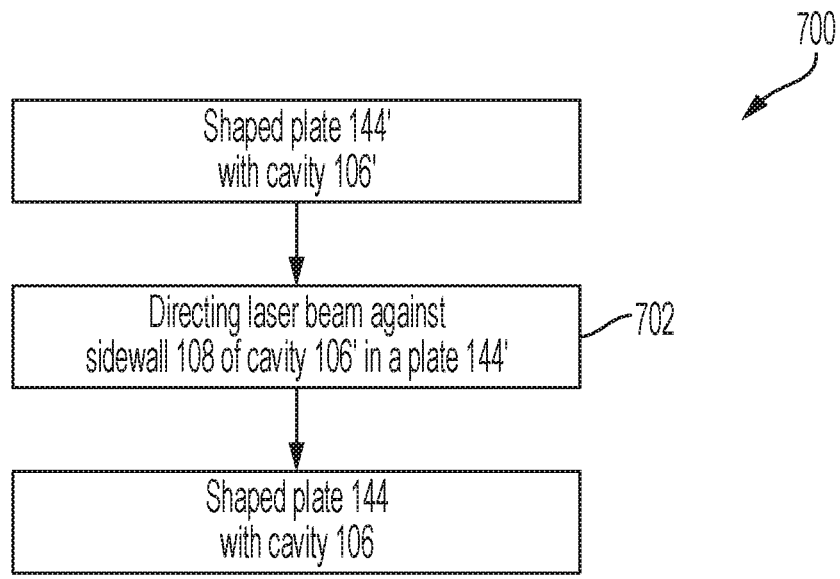
FIG. 7 is a schematic flow chart of an embodiment of a method of laser polishing a cavity in a plate for a liquid lens.

Referring now to FIG. 7, a schematic flow chart is provided that depicts a method 700 of laser polishing a cavity 106 in a shaped plate 144 for a liquid lens 100 (see FIG. 1). The method 700 includes a step 702 of directing a laser beam from a laser against a sidewall 108 of a cavity 106' in a shaped plate 144' (e.g., a shaped plate 144' that includes a cavity 106' in an interim form as shown in FIGS. 2 and 2A and described earlier). Suitable lasers for method 700 include, for example, a $CO_2$ laser 902 (e.g., as operating at a wavelength of about 10.6 μm) or other infrared laser source. The step 702 is conducted to polish the sidewall 108 of the cavity 106' in the shaped plate 144', both in interim form, to form a final cavity 106 in a shaped plate 144 having an average surface roughness ($R_a$) of less than or equal to 20 nanometers (nm), less than or equal to 10 nm, less than or equal to 5 nm, or less than or equal to 1 nm. Further, according to the method 700, the interim plate 144' and final shaped plate 144 comprises a glass composition, as the method may utilize material reflow to polish the sidewall 108. Further, the sidewall 108 of the cavity 106' is further defined by an angle 110 of about 45 degrees to about 90 degrees between the sidewall 108 and a base 144a of the plate 144'. Further, the laser comprises a power of less than 100 W, as employed according to the method 700.

As will be appreciated by those of ordinary skill in the field of the disclosure, the cavity 106' in the shaped plate 144' polished according to the method 700 shown in FIG. 7 can be formed by any of a variety of processes before the method 700 is initiated. These processes for forming the cavity 106' within a shaped plate 144' include, for example, the grit blasting methods 200 and 200a described earlier and depicted in FIGS. 2 and 2A. Other processes for forming the cavity 106' within the shaped plate 144' include, for example, pressing processes (e.g., with a mold having protrusions shaped consistent with the desired shape of the cavity), laser ablation processes, mechanical polishing processes, and others. As such, method 700 is structured to further polish an existing, interim cavity 106' within a shaped plate 144' into a final cavity 106 within a shaped plate 144 having a surface roughness ($R_a$) of about 20 nm or less, 10 nm or less, or 1 nm or less. In some embodiments of the method 700, the step of directing 702 is conducted such that the cavity 106 within the shaped plate 144 has a surface roughness ($R_a$) of less than or equal to 20 nm, 19 nm, 18 nm, 17 nm, 16 nm, 15 nm, 14 nm, 13 nm, 12 nm, 11 nm, 10 nm, 9 nm, 8 nm, 7 nm, 6 nm, 5 nm, 4 nm, 3 nm, 2 nm, 1 nm, and all values between these surface roughness values. In some implementations, the cavity 106 produced according to the method 700 can be characterized by an azimuthal symmetry with a maximum deviation (X) of up to 5 μm. In other embodiments, the cavity 106 can be characterized by an azimuthal symmetry with a maximum deviation (X) of up to 5 μm, 4.5 μm, 4 μm, 3.5 μm, 3 μm, 2.5 μm, 2 μm, 1.5 μm, 1 μm, 0.5 μm, and all azimuthal symmetry maximum deviation (X) values between these levels.

Figure 7A:
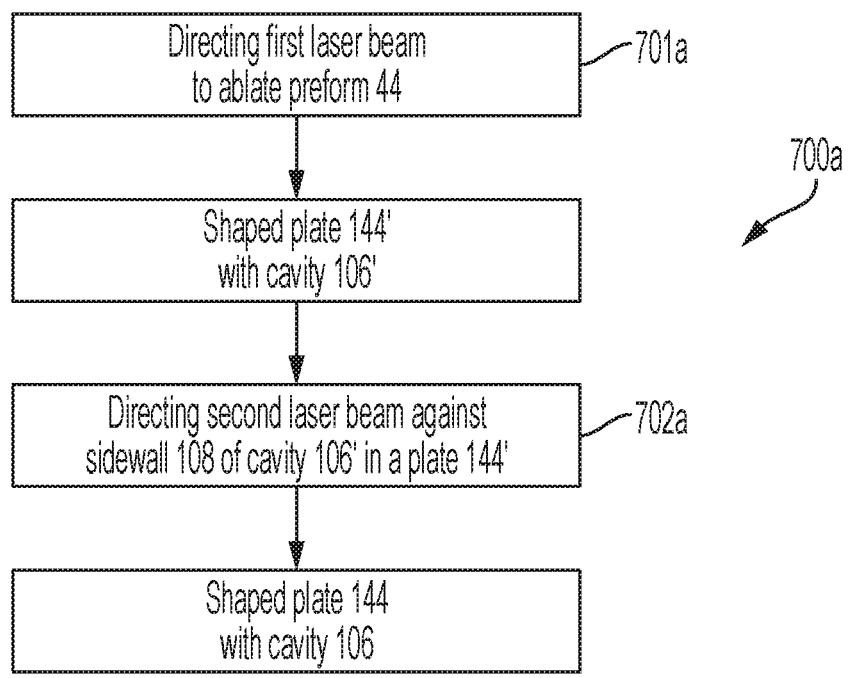
FIG. 7A is a schematic flow chart of an embodiment of a method of making a cavity in a plate for a liquid lens.

Referring now to FIG. 7A, a schematic flow chart is provided that depicts a method 700a of making a cavity 106 in a shaped plate 144 for a liquid lens 100 (see FIG. 1). The method 700a includes a step 701a of directing a first laser beam from a first laser against a preform 44 (e.g., a preform that is the same or substantially similar to the preform 44 shown in FIG. 2 and referenced in its corresponding description) to ablate a cavity 106' within the preform 44 to define an interim shaped plate 144' that includes the interim cavity 106'. In embodiments, the laser ablation step 701a is conducted with a high-power laser operating at a wavelength of 400 nm to 600 nm with a pulse width of about 5 picoseconds to 50 picoseconds (e.g., a laser operating at 532 nm at pulse width of 10 picoseconds). The laser ablation step 701a can be effected through the use of beam shaping optics to produce a Gaussian laser beam, and a galvanometer scanner to rapidly scan the laser beam on the preform 44 to form the interim cavity 106' through laser ablation.

The method 700a depicted in FIG. 7A further includes a step 702a of directing a second laser beam from a second laser against a sidewall 108 of a cavity 106' in a shaped plate 144' (e.g., a shaped plate 144' that includes a cavity 106' in an interim form as shown in FIGS. 2 and 2A and described earlier). The step 702a is conducted to polish the sidewall 108 of the cavity 106' in the shaped plate 144', both in interim form, to form a final cavity 106 in a shaped plate 144 having an average surface roughness ($R_a$) of less than or equal to 10 nanometers (nm). Further, according to the method 700a, the interim plate 144' and final shaped plate 144 comprises a glass composition, as the method may utilize material reflow to polish the sidewall 108. Further, the sidewall 108 of the cavity 106' is further defined by an angle 110 of about 45 degrees to about 90 degrees between the sidewall 108 and a base 144a of the plate 144'. Further, the second laser employed in step 702a comprises a power of less than 100 W, as employed according to the method 700a.

Figure 8:
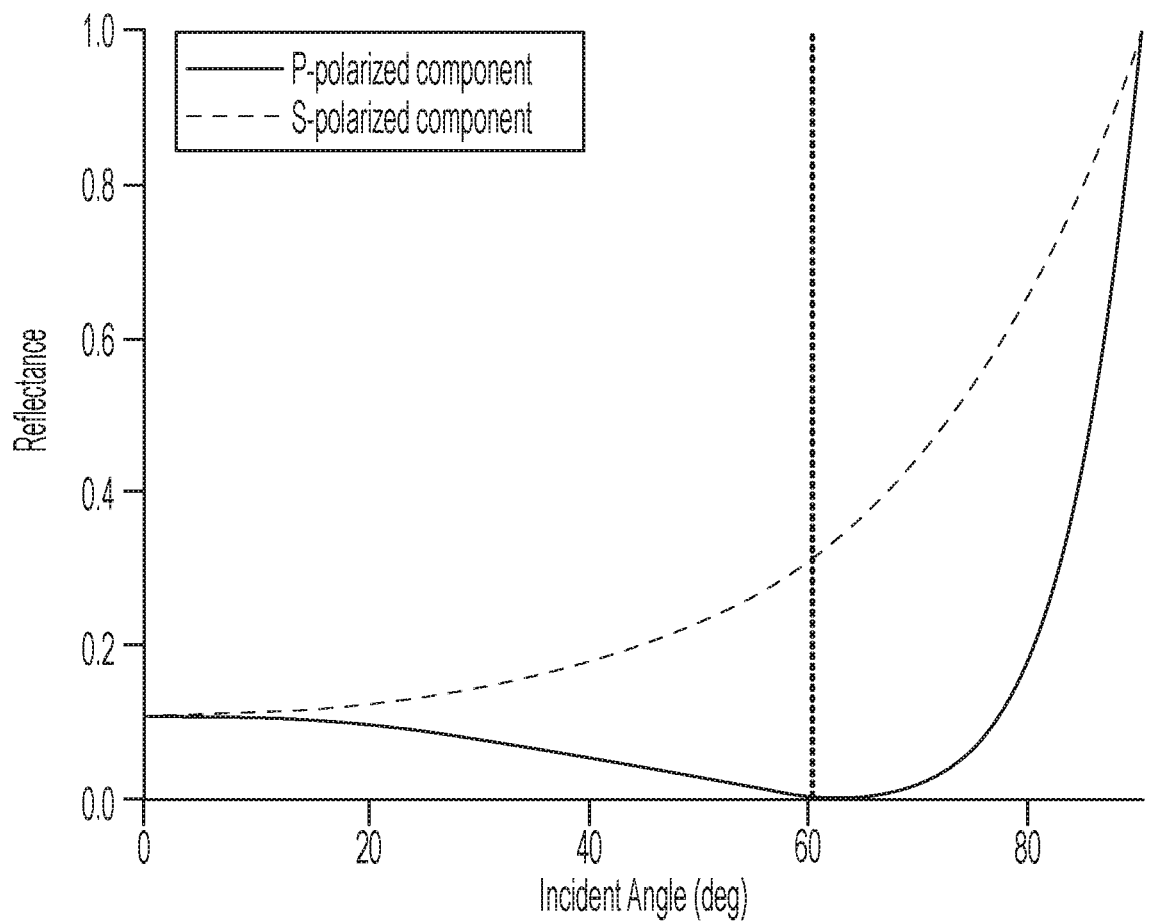
FIG. 8 is a plot of the S and P polarization reflectance of a $CO_2$ laser directed against a Corning® Eagle XG® glass substrate as a function of incident angle.

Referring now to FIG. 8, a calculated plot of the S and P polarization reflectance of a $CO_2$ laser (wavelength range from about 9.4 μm to about 10.6 μm) beam propagating in air at a wavelength of about 10.6 μm directed against a Corning® Eagle XG® glass substrate (i.e., as having a refractive index of about 1.97) as a function of incident angle is provided. As is evident from the figure, the reflectance values for the S and P components of the laser beam as it impinges on the glass substrate varies significantly as a function of the laser beam incident angle with the substrate. In particular, the S and P reflectance values are relatively consistent at incident angles of 30 degrees or less. In contrast, the S and P reflectance values significantly deviate as incident angles of 45 degrees or greater, as would be consistent with a conically shaped cavity 106 of a shaped plate (see FIG. 1). Without being bound by theory, it is believed that this reflectivity variation as a function of incident angle (as shown in FIG. 8) leads to significant variations in the absorbed energy in the surface of the glass substrate, leading to variable shape profiles in the surface polished according to a laser polishing process.

Figure 9:
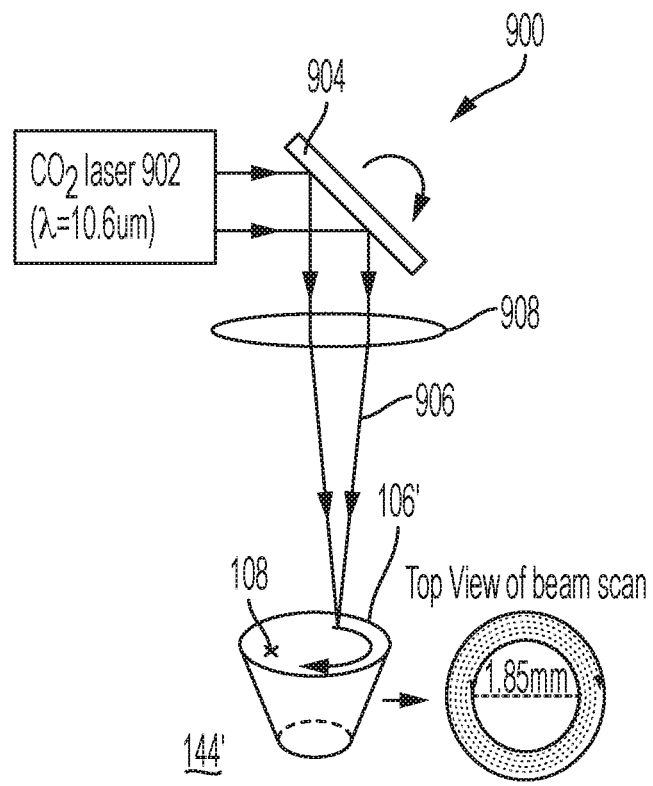
FIG. 9 is a schematic of a laser polishing apparatus for polishing a cavity in a plate for a liquid lens, according to an embodiment.

Referring now to FIG. 9, a schematic of a laser polishing apparatus 900 is depicted for polishing a cavity 106' in a shaped plate 144' for a liquid lens 100 (see FIG. 1), according to an embodiment, e.g., as according to the method 700 depicted in FIG. 7 and outlined above. As shown, the apparatus 900 can include a $CO_2$ laser 902 (e.g., as operating at a wavelength of about 10.6 µm) or other infrared laser source. Infrared lasers, such as the $CO_2$ laser 902, can offer a great deal of flexibility as a heating source. These laser sources provide a localized confinement of energy, which allows for fine temporal and spatial control using microsecond pulses with diffraction-limited beam diameters (e.g., laser beam diameters of less than 100 µm). $CO_2$ laser processing is particularly attractive for processing of glass substrates, such as employed in the shaped plate 144', given the high extinction coefficient at the wavelength of these lasers, e.g., a wavelength of about 10.6 µm. At this wavelength, the penetration depth of the laser beam energy from the $CO_2$ laser 902 is on the order of a few microns. As such, localized heating and melting of the glass occurs only at the skin or surface of the shaped plate 144', thus minimizing thermal stress-related concerns. Further, according to some embodiments of the method 700, the glass composition employed by the shaped plate 144 can be characterized by a coefficient of thermal expansion (CTE) that ranges from $0.5 \times 10^{-6}/°K$ to $10 \times 10^{-6}/°K$. In some implementations, the CTE of the glass employed in the shaped plate 144 can range from $3 \times 10^{-6}/°K$ to $10 \times 10^{-6}/°K$, particularly in view of the low amounts of thermal stresses developed according the method 700 and laser polishing apparatus 900. In other implementations, the method 700 can employ a shaped plate 144 made from a higher CTE glass composition that ranges from about $7 \times 10^{-6}/°K$ to about $10 \times 10^{-6}/°K$.

Referring again to FIG. 9, the laser polishing apparatus 900 can employ a $CO_2$ laser 902, which can take advantage of the foregoing considerations. In particular, the $CO_2$ laser 902 generates a laser beam 906 that is focused by a lens 908 onto the shaped plate 144'. Further, a galvanometer 904 is employed to scan the laser beam 906 around the interior surface of the cavity 106 along its sidewall 108. As the laser beam 906 is focused onto the cavity 106' of the shaped plate 144', the heating imparted by the laser 902 melts the surface of the glass locally. As the glass melts, the glass is reflowed and the net result is an optically polished surface, e.g., a cavity 106 having a surface roughness ($R_a$) of less than 20 nm within a shaped plate 144.

Referring again to the laser polishing apparatus 900 depicted in FIG. 9, the spatial profile of the deposited heat from the laser 902 is controlled by the scan traced out by the laser beam 906: consequently, inner sections or outer sections of the cavity 106' can be heated by adjusting the residence time of the laser beam 906 in those regions. A significant advantage of the laser polishing apparatus 900 (and the method 700 of laser polishing, and method 700a of making, a cavity 106 in a shaped plate 144 for a liquid lens 100 (see FIGS. 1, 7 and 7A) is that it is spatially selective and the reflowed sections of the shaped plate 144' are confined to the sidewall 108 of the cavity 106'. In some implementations, the shaped plate 144' can be pre-heated to minimize stress accumulation during the polishing with the laser polishing apparatus 900 and method 700 (see FIG. 7), e.g., to temperatures that range from about 200° C. to about 400° C. Nevertheless, the bulk of the shaped plate 144' (i.e., in regions outside of the sidewall 108 of the cavity 106') is not heated to a high enough temperature to melt or reflow the glass, e.g., well below approximately 700° C. By maintaining the temperature of the shaped plate 144 to a relatively low value, dimensional changes to the plate 144' caused by temperature gradients and/or compaction can be avoided. Further, the precise control of the amount of energy exposure to the sidewall 108 of the cavity 106' offered by the laser apparatus 900 and the method 700, can induce controlled surface melting of the glass and induce reflow. This heating and reflow effectively acts as a low-pass filter for the surface shape of the sidewall 108 and removes all high-frequency roughness, perturbations, and like from the surface. The final result is a pristine sidewall 108 of a cavity 106 within a shaped plate 144, e.g., as characterized by a surface roughness ($R_a$) of less than or equal to 20 nm, 19 nm, 18 nm, 17 nm, 16 nm, 15 nm, 14 nm, 13 nm, 12 nm, 11 nm, 10 nm, 9 nm, 8 nm, 7 nm, 6 nm, 5 nm, 4 nm, 3 nm, 2 nm, 1 nm, and lower.

Figure 9A:
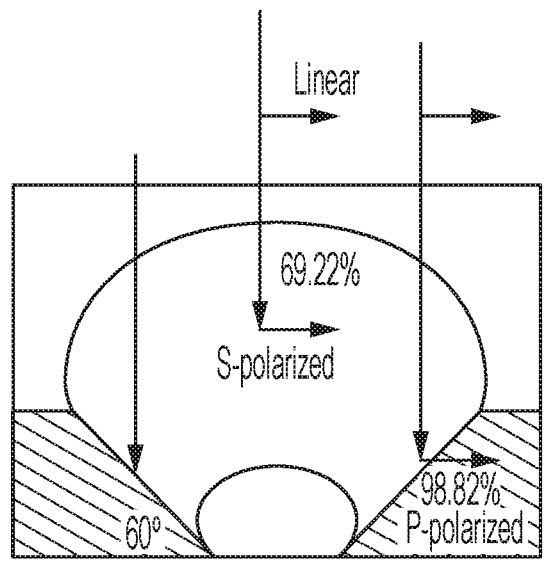
FIG. 9A is a schematic illustration of the degree of polarization of a linearly polarized laser beam as it strikes two portions of a cone approximately 90 degrees from one another.

As discussed earlier in connection with FIG. 8, methods of polishing a cavity employing a laser apparatus 900 (see FIG. 9) can be susceptible to reflectance variations as a function of location on the sidewall 108 of the cavity 106. As shown in FIG. 9A, a schematic illustration is provided of the degree of polarization of a linearly polarized laser beam as it strikes two portions of a cone (e.g., a cavity 106) approximately 90 degrees from one another. In particular, the laser beam comprises about 69% of S-polarized light at a first location on the sidewall 108 of the cavity 106 and comprises about 99.8% of P-polarized light at a second location on the sidewall 108 of the cavity 106, with these locations about 90 degrees from one another. In turn, these reflectivity differences lead to sidewall 108 profiles that vary as a function of azimuthal angle around the cavity 106.

Figure 10A:
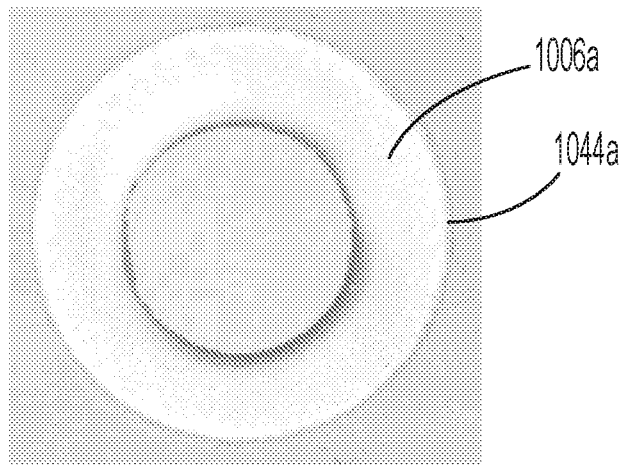
FIG. 10A is a top view photograph of a glass cone formed from a laser ablation process.
Figure 10B:
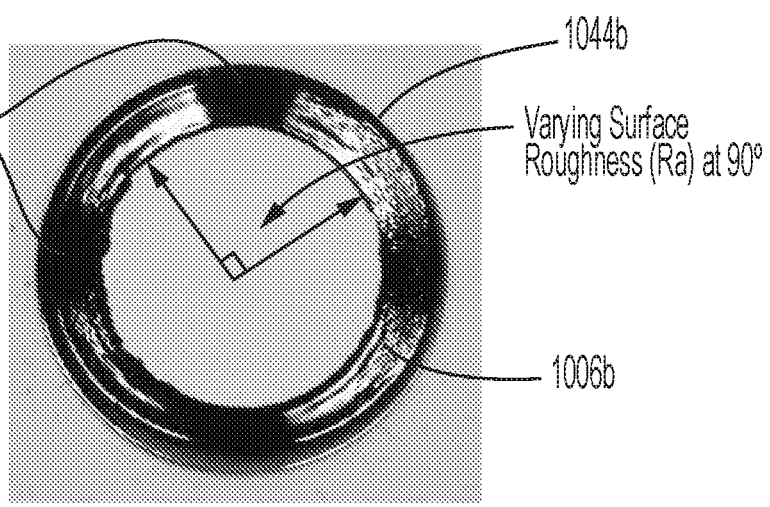
FIG. 10B is a top view photograph of the glass cone depicted in FIG. 10A, as polished with a linearly polarized laser beam.
Figure 10C:
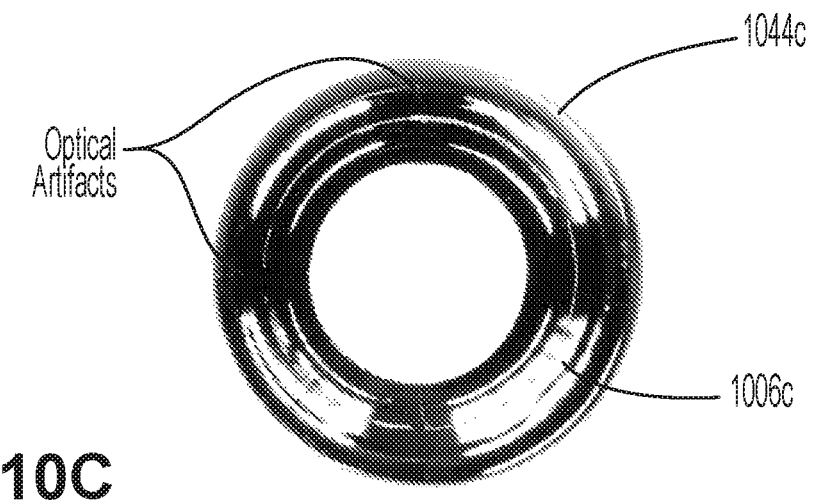
FIG. 10C is a top view photograph of the glass cone depicted in FIG. 10B, as polished with a circularly polarized beam, according to an embodiment.

Referring now to FIGS. 10A-10C, a series of top view photographs of cavities formed in shaped glass plates (1.2 mm thick phosphosilicate glass) demonstrates the effect of laser beam polarization on the polishing profiles of sidewalls of cavities (cavities with 60 degree sidewall angles) in shaped plates, according to embodiments of the disclosure. In particular, FIG. 10A is a top view photograph of a cavity 1006a in a shaped plate 1044a, as formed from a laser ablation process. FIG. 10B is a top view photograph of the cavity depicted in FIG. 10A, as polished with a linearly polarized laser beam with a laser apparatus substantially similar to the apparatus 900 (see FIG. 9 and corresponding description) to form a cavity 1006b within a shaped plate 1044b, according to an embodiment. In particular, the cavity 1006b was prepared by employing a laser beam at a power of less than 15 W, with a galvanometer used to scan the laser beam at a spot size of about 170 µm across the sidewall. Further, the laser power was carefully controlled to ensure a scan speed of about 1 cm/s, allowing the formation of the cavity 1006b in about 0.3 seconds with a process that employed about 15 J of total energy. In addition, the shaped plate employed to form the cavity 1006b was processed at an elevated temperature of about 300° C. and subsequently thermally annealed (400° C. for about 15 minutes) after laser polishing to remove any residual stress developed during the polishing process As is evident in FIG. 10B (and discussed earlier in connection with FIGS. 8 and 9A), reflectivity differences associated with the azimuthal position of the beam as it impinges on the sidewall of the cavity 1006*b* lead to variations in the polished wall profiles. In particular, regions of well-polished glass are observed at the 12 o'clock and 6 o'clock positions in the cavity 1006*b* of FIG. 10B, while the regions at 3 o'clock and 9 o'clock remain rough and not well polished.

The problems associated with polishing as a function of azimuthal angle can be resolved by convert the incident, polarized laser radiation from linear (vertical) to circular. With circularly polarized energy, the beam has equal components of S- and P-polarized energy, regardless of phase location, and the energy is equally deposited on all surfaces of the three-dimensional structure of the sidewall 108 of the cavity 106, regardless of the surface angle. With these principles in mind, embodiments of the methods 700, 700*a* and the laser polishing apparatus 900 (see FIGS. 7, 7A and 9) can employ laser beams with circular polarization. Referring now to FIG. 10C, a top view photograph of the cavity depicted in FIG. 10A is shown, as polished with a circularly polarized beam from a laser apparatus substantially similar to the apparatus 900 (see FIG. 9 and corresponding description) to form a cavity 1006*c* within a shaped plate 1044*c*, according to an embodiment. The parameters and process conditions employed to produce the cavity 1006*c* were the same as those employed to produce the cavity 1006*b* (see FIG. 10B), except for the noted differences in the polarization of the laser beam employed to produce these cavities. As is evident from FIG. 10C, the sidewall of the cavity 1006*c* has significant azimuthal symmetry, demonstrating that the energy deposition around the cavity 1006*c* was more uniform than the linearly polarized beam used to create the cavity 1006*b* of FIG. 10B.

Referring again to FIGS. 7 and 7A, the method 700 of polishing, and method 700*a* of making, a cavity 106' of a shaped plate 144' can be conducted such that the laser beam employed in the directing step 702 and 702*a*, respectively, is circularly polarized, such that the beam comprises a fluctuation in power of no more than 10% during the step 702 of directing the laser beam. With regard to the laser polishing apparatus 900 depicted in FIG. 9, the polarization can be converted from linear to circular through approaches that employ a quarter-wave retarder or quarter-wave plate (not shown) within the laser beam 906. According to embodiments of the methods 700 and 700*a*, the conversion to circular polarization can be verified or otherwise validated by the inclusion of a linear polarizer within the laser beam 906 and measuring the output power. With circular polarization, the measured power will not change significantly as the linear polarizer is rotated about an angle of 360 degrees. In implementations of the method 700, the amount of fluctuation in power observed as the linear polarizer is rotated should be maintained to less than 10%, less than 5% or, even more preferably, less than 1%.

Referring again to FIGS. 7, 7A and 9, the method 700 of laser polishing, and method 700*a* of making, a cavity 106' of a shaped plate 144' can be conducted with laser polishing apparatus 900 according to various parameters. In embodiments of the methods 700 and 700*a*, the power applied to the $CO_2$ laser 902 can range from about 5 W to about 100 W, preferably between 10 W and 50 W. The energy dose applied by the laser 902 during the step 702, 702*a* (see FIGS. 7 and 7A) of directing the laser beam 906 can range from about 5 J to about 50 J, preferably from about 15 J to about 30 J. Further, the spot size of the $CO_2$ laser 902 can range from about 50 μm to about 600 μm, preferably between 100 μm and 250 μm. According to some embodiments of the methods 700 and 700*a*, the shaped plate 144' and cavity 106' can be heated with a chuck or other comparable apparatus as understood by those of ordinary skill in the field of the disclosure between about 200° C. and about 600° C. preferably between about 300° C. and about 500° C. In addition, the step 702, 702*a* of the methods 700, 700*a*, respectively, can be conducted such that the laser beam 906 is moved around the sidewall 108 of the cavity 106' at a scan speed that ranges from about 10 mm/s to about 1000 mm/s, preferably from about 100 mm/s to about 500 mm/s.

Figure 11A:
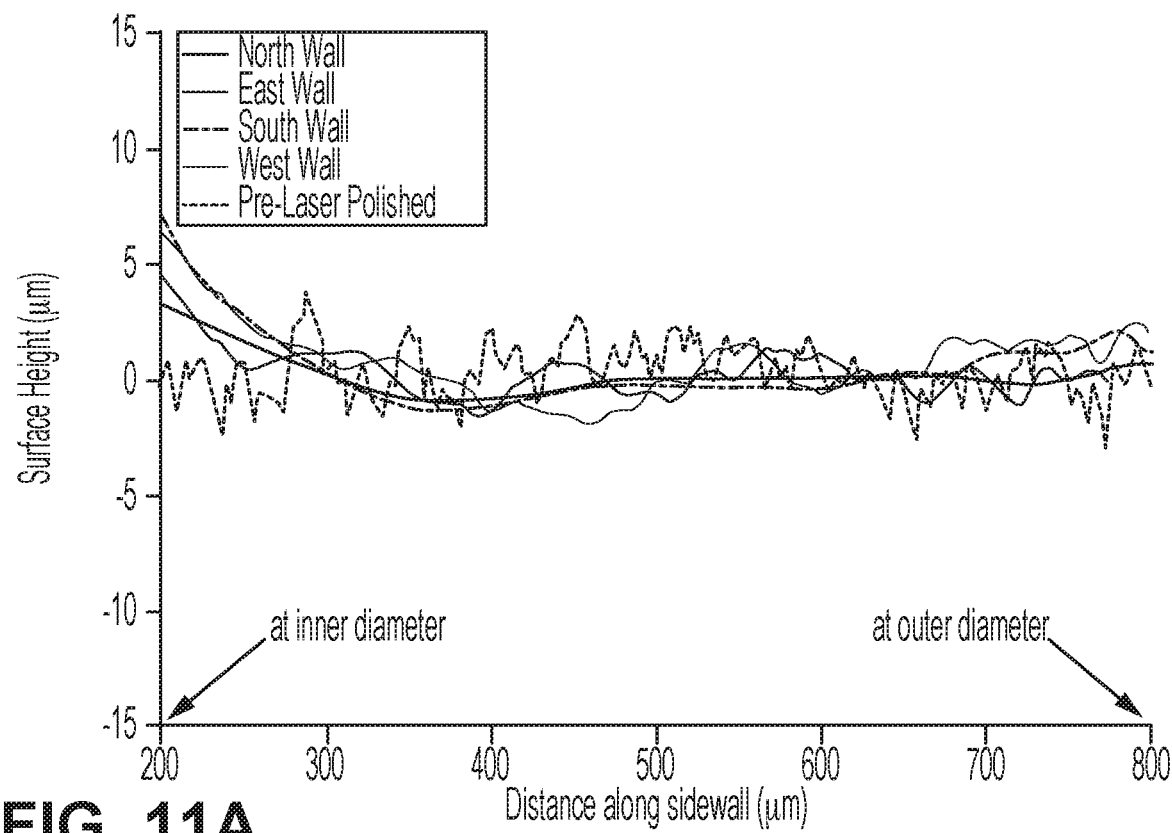
FIGS. 11A and 11B are wall scans of cone wall locations for glass cone samples, as polished with a linearly polarized laser beam and a circularly polarized laser beam, respectively, according to embodiments.
Figure 11B:
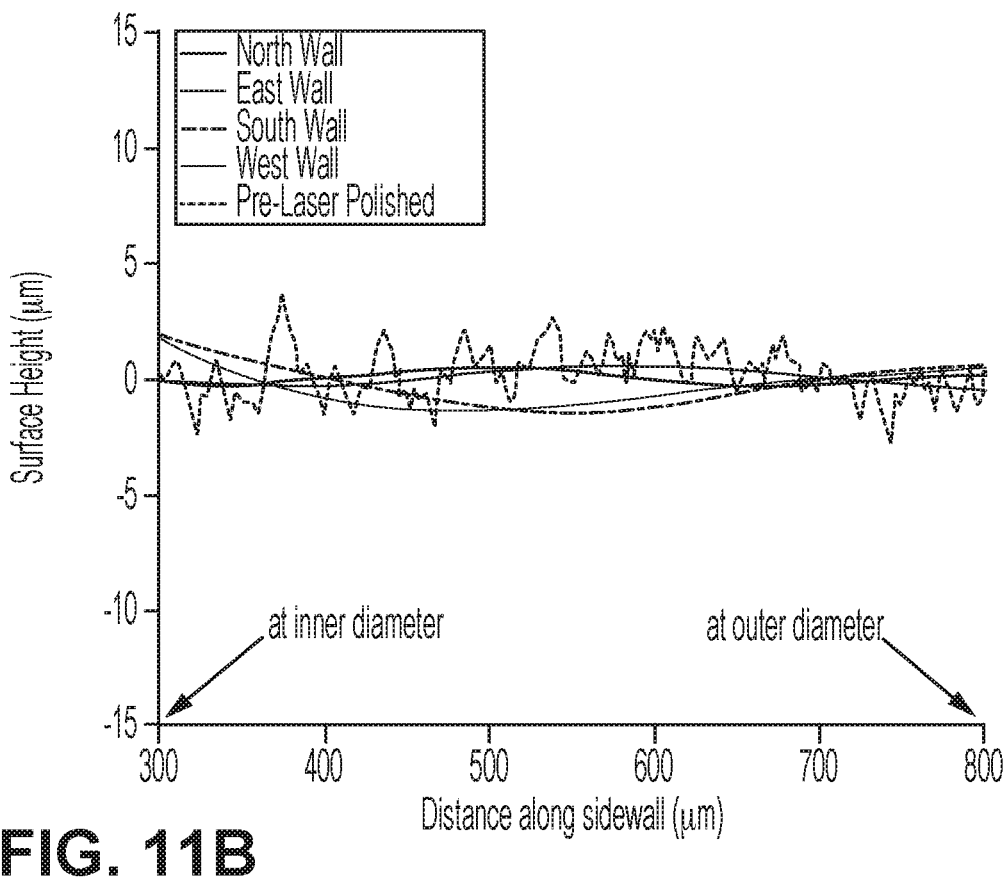

Referring now to FIGS. 11A and 11B, wall scans of sidewall locations for cavities of glass shaped plate samples are shown, as polished with a linearly polarized laser beam and a circularly polarized laser beam, respectively, according to embodiments of the disclosure. In particular, the walls scans in these figures show surface height (μm) as a function of distance along the sidewall of the cavities of the shaped plates polished with the respective linearly polarized and circularly polarized laser beams. Further, each of the figures shows walls scans at north (N), east (E), South (S) and west (W) wall locations, each 90 degrees from one another. Each of the figures also includes a representative wall scan from the cavity in an as-formed condition prior to laser polishing. With regard to FIG. 11A, the sidewall of the cavity polished with a linearly polarized laser beam exhibits a noticeable azimuthal variation across the cavity that can be linked to the polarization/reflectance variation observed and discussed earlier in connection with FIGS. 8 and 9A. That is, significant variability exists between the N, E, W and S wall scans as a function of sidewall location. In contrast, with regard to FIG. 11B, the sidewall of the cavity polished with the circularly polarized laser beam exhibits significantly less azimuthal variation across the cavity in comparison to the wall scans of the cavity prepared with a linearly polarized laser beam shown in FIG. 11A.

Figure 12:
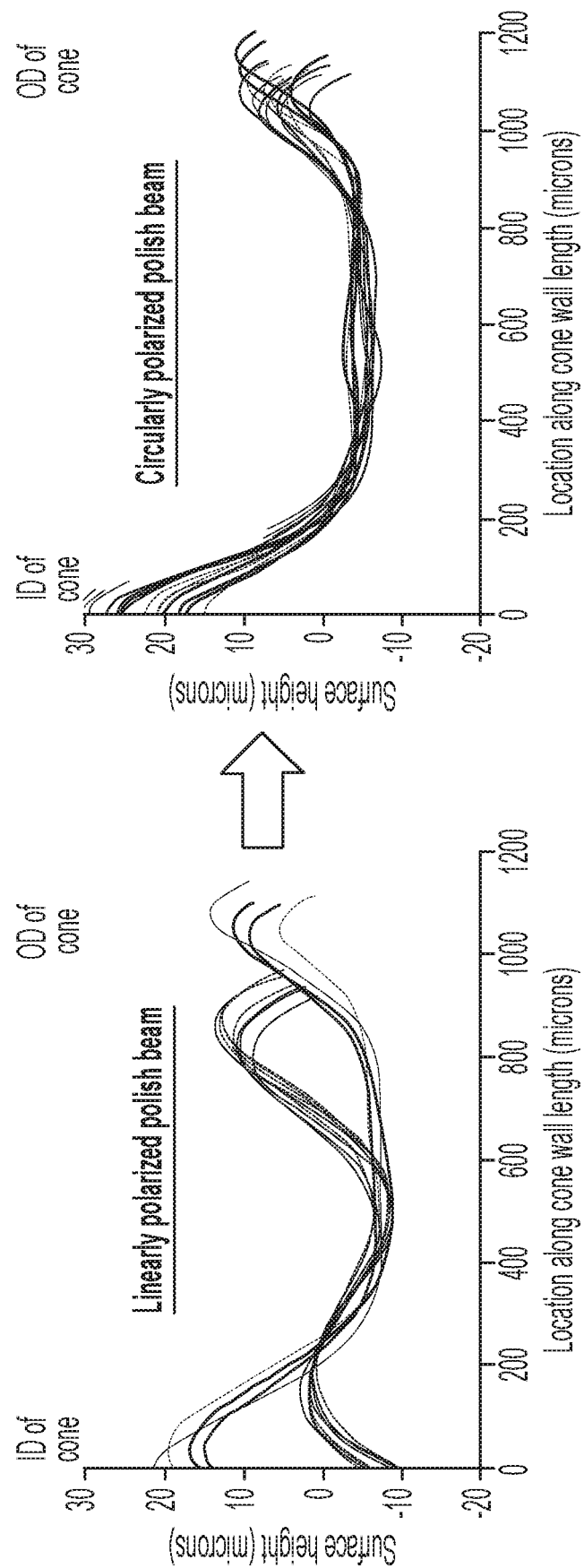
FIG. 12 is a plot of the surface height vs. location along the sidewall of a glass cones, as polished with a linearly polarized laser beam and a circularly polarized laser beam, respectively, according to embodiments.

Referring now to FIG. 12, a plot of the surface height (μm) vs. location (μm) along the sidewall of a cavity of a shaped plate having a glass composition, as polished with a linearly polarized laser beam (left-hand plot) and a circularly polarized laser beam (right-hand plot), respectively, according to embodiments. As is evident in this figure, the introduction of circularly polarized light leads not only to improved polishing of the sidewall of the cavity, but also to improved rotational symmetry in the sidewall shape azimuthally around the cavity. Without being bound by theory, as a section of the cavity is heated more, it can undergo more reflow than a less-heated section, which can lead to different surface shapes as a function of temperature and the duration of the thermal exposure. Accordingly, it can be important to maintain an azimuthally uniform energy deposition around the cavity to maintain a consistent sidewall shape or cross-section. Advantageously, maintain a high degree of azimuthal symmetry (e.g., a maximum deviation (X) of less than 5 μm) can significantly improve the performance of a liquid lens (e.g., liquid lens 100 depicted in FIG. 1), whereas any asymmetries can have the negative effect of promoting optical aberrations such as astigmatism. As is evident in the left-hand plot in FIG. 12, the linearly polarized laser beam light results in surface shapes at the north and south walls (i.e., the plots showing a surface height of about 20 μm at the ID of the cavity/cone) that are significantly different than the shapes of the east and west walls (i.e., the plots showing a surface height of about-8 μm at the ID of the cavity/cone). This is because the north/south sidewall locations on the cavity had less reflectivity and absorbed more energy than the east/west sidewall locations. Nevertheless, it is evident from the right-hand plot in FIG. 12 that the circularly polarized laser beam results in a cavity with a sidewall shapes at various sidewall locations that are all substantially the same, regardless of azimuthal angle.

Referring again to the method 700 of laser polishing, and method 700a of making, a cavity depicted in FIGS. 7 and 7A, respectively, and described earlier, the laser beam employed in step 702 and 702a, respectively, need not be circularly polarized to address the S vs. P reflectance asymmetry problem outlined earlier (see also FIGS. 8 and 9A, and corresponding description). The laser beam can also be depolarized, which means that the polarization state oscillates randomly in time, at least on a time scale that is fast compared to the laser exposure of any small section of the glass substrate. For example, the laser beam can be depolarized using an optical element such as a reflective diffuser, as understood by those of ordinary skill in the field of the disclosure. Other methods to depolarize the laser beam in step 702 or 702a include, for example, scattering light through salt granules, using rapidly rotating elements to scramble the polarization of light in time, or beating two orthogonal polarizations together (i.e., phase decoupling by employing using beam splitters). In one setup, the laser beam in step 702 or 702a passes through a lens and impinges on a reflective diffuser, with the reflected directed toward the cavity 106' of the shaped plate 144". As this non-scanned beam illuminates the cavity 106', the surface of the cavity is heated until and reflow is achieved. Using a diffuser with a 600-grit surface, this arrangement and method can achieve azimuthally symmetric cavities 106 in a shaped plate 144, with a maximum deviation (X) of no more than 10 µm. In addition, a similar diffuser strategy can be used with a scanned laser beam as well (see FIG. 9 and its corresponding description).

Figure 13:
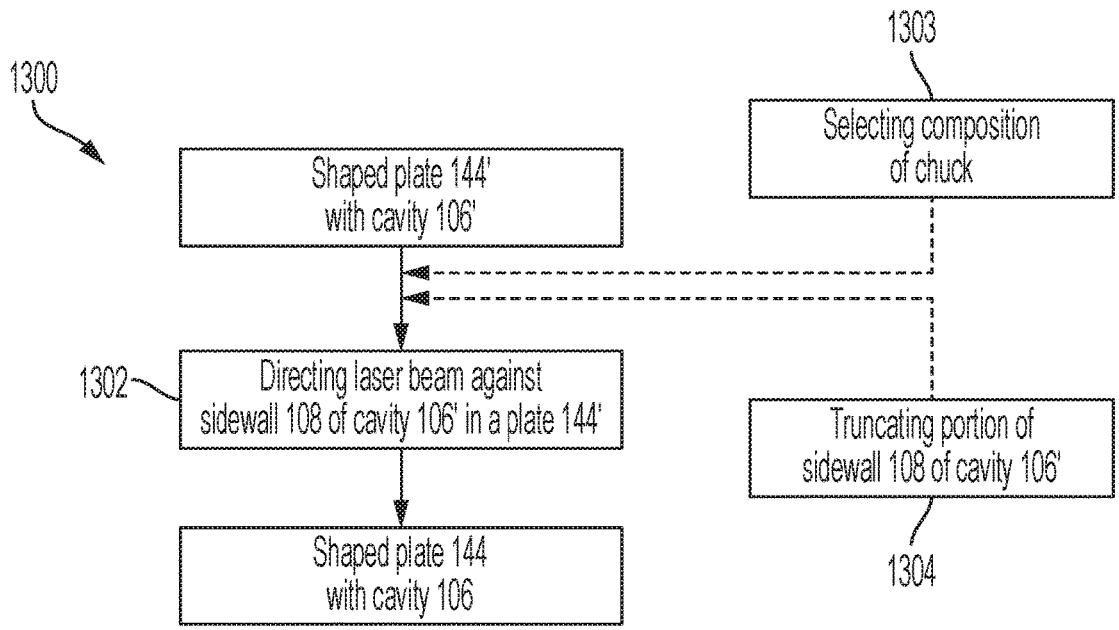
FIG. 13 is a schematic flow chart of an embodiment of a method of laser polishing a cavity in a plate for a liquid lens.

Referring now to FIG. 13, a schematic flow chart is provided that depicts a method 1300 of laser polishing a cavity 106 in a shaped plate 144 for a liquid lens 100 (see FIG. 1). The method 1300 includes a step 1302 of directing a laser beam from a laser against a sidewall 108 of a cavity 106' in a shaped plate 144' (e.g., a shaped plate 144' that includes a cavity 106' in an interim form as shown in FIGS. 2 and 2A and described earlier). The step 1302 is conducted to polish the sidewall 108 of the cavity 106' in the shaped plate 144', both in interim form, to form a final cavity 106 in a shaped plate 144 having an average surface roughness ($R_a$) of less than or equal to 20 nanometers (nm), 10 nm, or 1 nm. Step 1302 is also conducted to polish the sidewall 108 of the cavity 106' such that a linearity of a first bottom portion 146 of the sidewall 108 in proximity to the base 144a of the final shaped plate 144 is from 0 µm±5 µm. Further, according to the method 1300, the interim plate 144' and final shaped plate 144 comprises a glass composition, as the method typically will utilize material reflow to polish the sidewall 108. Further, the sidewall 108 of the cavity 106' is further defined by an angle 110 of about 45 degrees to about 90 degrees between the sidewall 108 and a base 144a of the plate 144'. In addition, the laser employed according to the method 1300 comprises a power of less than 100 W.

As will be appreciated by those of ordinary skill in the field of the disclosure, the cavity 106' in the shaped plate 144' polished according to the method 1300 shown in FIG. 13 can be formed by any of a variety of processes before the method 1300 is initiated. These processes for forming the cavity 106' within a shaped plate 144' include, for example, the grit blasting methods 200 and 200a described earlier and depicted in FIGS. 2 and 2A. Other processes for forming the cavity 106' within the shaped plate 144' include, for example, pressing processes, laser ablation processes, mechanical polishing processes, and others. As such, method 1300 is structured to further polish an existing, interim cavity 106' within a shaped plate 144' into a final cavity 106 within a shaped plate 144 having a surface roughness ($R_a$) of about 20 nm or less, 10 nm or less, or 1 nm or less. The method 1300 is further structured to obtain a sidewall with substantial linearity, e.g., such that a linearity of a first bottom portion 146 of the sidewall 108 in proximity to the base 144a of the final shaped plate 144 is from 0 µm±5 µm. For example, as shown in FIG. 1, a first bottom portion 146 of the sidewall 108 in proximity to the base 144a of the shaped plate 144 can be formed according to the method 1300 with a linearity from 0 µm to ±10 µm, 0 µm to +7.5 µm, 0 µm to +5 µm, or even 0 µm to +2.5 µm. According to some embodiments of the method 1300 depicted in FIG. 13, the first bottom portion 146 of the sidewall 108 can extend from the base 144a of the shaped plate 144 to a first bottom portion length 146a (see FIG. 1). In some embodiments of the method 1300, the first bottom portion length 146a can be formed with substantial linearity up to 80% of the total length of sidewall 108 (e.g., from 250 µm to 3000 µm). In other embodiments, the first bottom portion length 146a (i.e., as corresponding to the portion 146 having substantial linearity) can extend to a position within 2000 µm, 1750 µm, 1500 µm, 1250 µm, 1000 µm, 750 µm, 500 µm, 250 µm, or any position between these values, from the base 144a. Hence, the first bottom portion length 146a can have a length of about 2000 µm, 1750 µm, 1500 µm, 1250 µm, 1000 µm, 750 µm, 500 µm, 250 µm, or any length values between these lengths.

Referring again to the method 1300 of polishing a cavity 106 in a shaped plate 144 for a liquid lens 100 (see FIG. 1) depicted in FIG. 13, additional steps or adjustments to existing steps can be employed to improve the linearity of the sidewall 108 of the cavity 106 within the shaped plate 144. For example, the step 1302 of directing a laser beam against a sidewall 108 of the cavity 106' can be further conducted with a top surface 1351 of a chuck 1350 beneath and in contact with the base 144a of the shaped plate 144 (see FIG. 13B). Further, the step 1302 can be conducted such that the angle 110 between the base 144a of the shaped plate 144' and a contact angle 110a formed by molten glass from the sidewall 108 and the top surface 1351 of the chuck 1350 are within 10 degrees of each other (see FIG. 13B). That is, step 1302 can be conducted to ensure that the contact angle 110a of the molten glass of the sidewall 108 is substantially similar to the angle of the cavity 106 itself, thus promoting linearity of the sidewall 108 upon cooling of the sidewall 108 after completion of step 1302.

In some embodiments of the method 1300, an optional step 1303 (see FIGS. 13 and 13B) of selecting a composition of the chuck 1350 can be employed to promote linearity of the sidewall 108, with step 1303 being conducted prior to step 1302 of directing a laser beam against the sidewall 108. For example, the composition of the chuck 1350 can be selected according to optional step 1303 such that its surface energy and that of the glass composition of the shaped plate 144' are within 25% of each other. In some embodiments, the surface energies of the shaped plate 144' and the chuck 1350 are selected to be within 25%, 20%, 15%, 10%, or even 5%, of each other. Put another way, step 1303 can be conducted (e.g., through choice of the composition of the chuck 1350) to ensure that the contact angle 110a of the molten glass of the sidewall 108 is substantially similar to the angle 110 of the cavity 106 itself, thus promoting linearity of the sidewall 108 upon cooling of the sidewall 108 after completion of step 1302.

According to some embodiments of the method 1300, an optional step 1304 (see FIGS. 13 and 13C) can be employed to promote linearity of the sidewall 108, with step 1304 being conducted before the step 1302 of directing a laser beam against the sidewall 108. More particularly, the method 1300 can include a step 1304 of truncating a second bottom portion 147 of the sidewall 108 of the shaped plate 144'. In some embodiments, the truncating step 1304 is accomplished through a laser ablation process (e.g., as comparable to step 701a in the method 700a depicted in FIG. 7A). By truncating a portion of the sidewall 108 prior to the laser polishing step 1302, the method 1300 advantageously allows a portion of the reflowed or melted sidewall 108 to flow into the space of the sidewall 108 created by truncating step 1304, thus promoting linearity of the sidewall 108 upon cooling of the glass after completion of step 1302. For example, truncating step 1304 can leave a void region near the chuck that can be filled with molten glass during the polishing process, thereby forming a cavity sidewall with substantial linearity. In embodiments, an angle between the second bottom portion 147 of the sidewall 108 and the base 144a of the shaped plate 144' is about 90 degrees. In other embodiments, this angle associated with the second bottom portion 147 is about 45 degrees, 60 degrees, 75 degrees, 90 degrees, and all angle values between these angles. Further, it should be understood that the second bottom portion 147 created by the step 1304 can be linear as shown in FIG. 13C, but may also take on other shapes (e.g., a chamfered edge, a beveled edge, a curved edge, a rounded edge, etc.). The truncating step 1304 of the method 1300 can be conducted such that the second bottom portion 147 of the sidewall 108 extends from the base 144a of the shaped plate 144' to a second bottom portion length 147a. Unless otherwise noted, all references to a "truncation" or "truncated length" are in reference to a truncated length of shaped plate 144a measured normal to the base 144a, e.g., a second bottom portion length 147a (as shown in FIG. 13C). In some implementations, the second bottom portion length 147a can be at least about 10 µm, 20 µm, 30 µm, 40 µm, 50 µm, 60 µm, 70 µm, 80 µm, 90 µm, 100 µm, 150 µm, 200 µm, 250 µm, 300 µm, 350 µm, or even longer distances, depending on the thickness of the shaped plate 144".

Figure 13A:
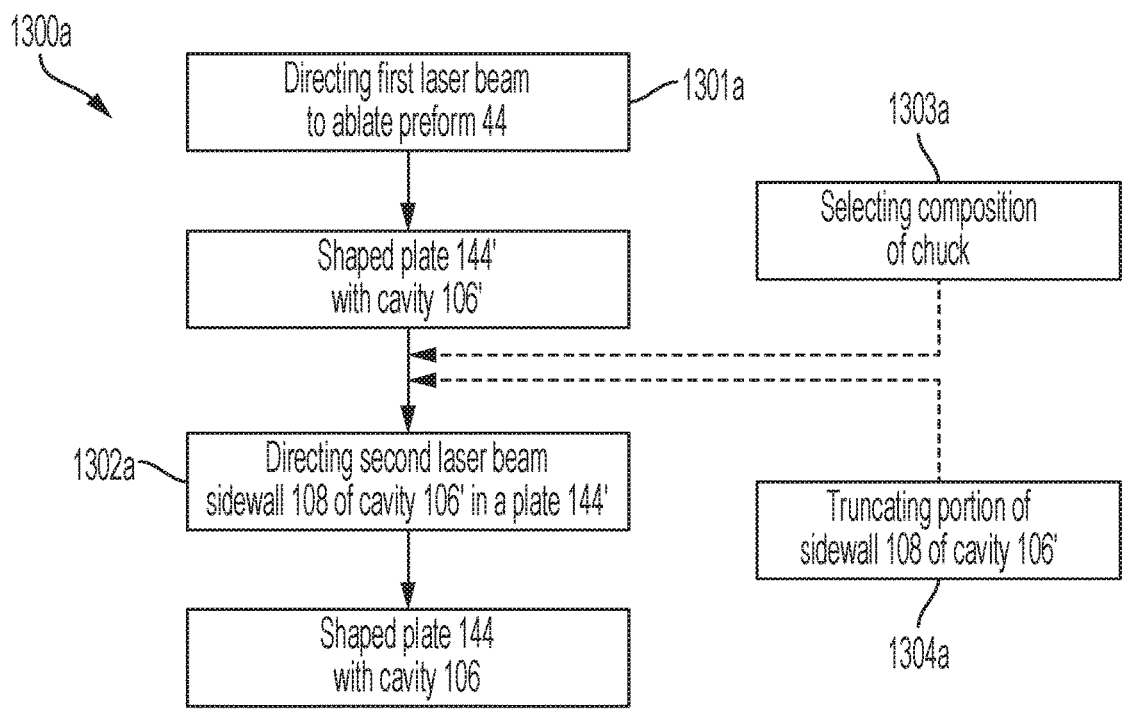
FIG. 13A is a schematic flow chart of an embodiment of a method of making a cavity in a plate for a liquid lens.

Referring now to FIG. 13A, a schematic flow chart is provided that depicts a method 1300a of making a cavity 106 in a shaped plate 144 for a liquid lens 100 (see FIG. 1). The method 1300a includes a step 1301a of directing a first laser beam from a first laser against a preform 44 (e.g., a preform that is the same or substantially similar to the preform 44 shown in FIG. 2 and referenced in its corresponding description) to ablate a cavity 106' within the preform 44 to define an interim shaped plate 144' that includes the interim cavity 106'. In embodiments, the laser ablation step 1301a is conducted with a high-power laser operating at a wavelength of 400 nm to 600 nm with a pulse width of about 5 picoseconds to 50 picoseconds. The laser ablation step 1301a can be effected through the use of beam shaping optics to produce a Gaussian laser beam, and a galvanometer scanner to rapidly scan the laser beam on the preform 44 to form the interim cavity 106' through laser ablation.

The method 1300a depicted in FIG. 13A further includes a step 1302a of directing a second laser beam from a second laser against a sidewall 108 of a cavity 106' in a shaped plate 144' (e.g., a shaped plate 144' that includes a cavity 106' in an interim form as shown in FIGS. 2 and 2A and described earlier). The step 1302a is conducted to polish the sidewall 108 of the cavity 106' in the shaped plate 144', both in interim form, to form a final cavity 106 in a shaped plate 144 having an average surface roughness ($R_a$) of less than or equal to 20) nanometers (nm), 10 nm or 1 nm. Further, according to the method 1300a, the interim plate 144' and final shaped plate 144 comprises a glass composition, as the method may utilize material reflow to polish the sidewall 108. Further, the sidewall 108 of the cavity 106' is further defined by an angle 110 of about 45 degrees to about 90 degrees between the sidewall 108 and a base 144a of the plate 144'. Further, the second laser employed in step 1302a comprises a power of less than 100 W, as employed according to the method 1300a.

The method 1300a depicted in FIG. 13A is also structured to obtain a sidewall with substantial linearity, e.g., such that a linearity of a first bottom portion 146 of the sidewall 108 in proximity to the base 144a of the final shaped plate 144 is from 0 µm±5 µm. For example, as shown in FIG. 1, a first bottom portion 146 of the sidewall 108 in proximity to the base 144a of the shaped plate 144 can be formed according to the method 1300a with a linearity from 0 µm to +10 µm, 0 µm to +7.5 µm, 0 µm to ±5 µm, or even 0 µm to ±2.5 µm. According to some embodiments of the method 1300a depicted in FIG. 13, the first bottom portion 146 of the sidewall 108 can extend from the base 144a of the shaped plate 144 to a first bottom portion length 146a (see FIG. 1). In some embodiments of the method 1300a, the first bottom portion length 146a can be formed with substantial linearity up to 80% of the total length of sidewall 108 (e.g., from 250 µm to 3000 µm). In other embodiments of the method 1300a, the first bottom portion length 146a (i.e., as corresponding to the portion 146 having substantial linearity) can extend to a position within 2000 µm, 1750 µm, 1500 µm, 1250 µm, 1000 µm, 750 µm, 500 µm, 250 µm, or any position between these values, from the base 144a. Hence, the first bottom portion length 146a can have a length of about 2000 µm, 1750 µm, 1500 µm, 1250 µm, 1000 µm, 750 µm, 500 µm, 250 µm, or any length values between these lengths. In addition, it should also be understood that the method 1300a can be conducted to improve the linearity of the sidewall 108 of the cavity 146 by use of the optional steps 1303a and/or 1304a, each modeled after steps 1303 and 1304, respectively, as described earlier in connection with the method 1300 depicted in FIG. 13.

Referring now to FIGS. 14A-14F, optical micrographs are provided of cross-sections of laser-polished cavities within shaped plates for liquid lenses (e.g., liquid lenses 100 shown in FIG. 1). As noted earlier, the laser polishing methods of the disclosure (e.g., methods 700) and 1300 shown in FIGS. 7 and 13) typically causes reflow of the glass of the sidewall of the cavity. This heating and re-flow effectively acts as a low-pass filter for the shape of the sidewall and advantageously removes high spatial frequency roughness or features from the surface. In some embodiments, the net result of these laser polishing methods is a pristine optical surface with a surface roughness that can be less than 20 nm, 10 nm, or even 1 nm ($R_a$). Nevertheless, while the high spatial roughness is removed by these processes, it also possible to apply excessive energy to the surface of the sidewall of the cavity from the laser polishing process. In turn, this excessive energy can result in distortion of the final shape of the sidewall upon cooling, particularly at the top and bottom edges of the sidewall, by virtue of the relaxation of the glass as it cools and its surface tension in a molten state. These effects are evident in the micrographs of FIGS. 14A-14F, which depict the resulting shapes of the sidewall upon laser polishing at the particular power levels noted in the figures.

Figure 14A:
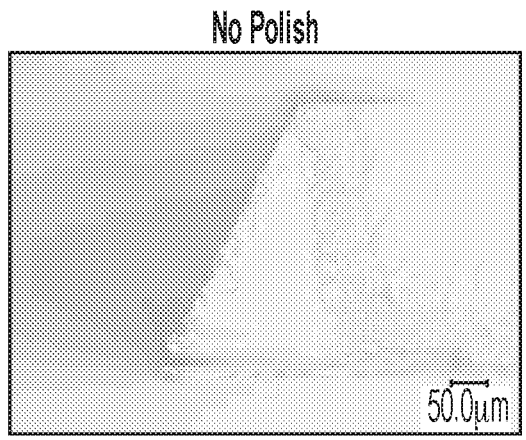
FIGS. 14A-14F are optical micrographs of cross-sections of embodiments of laser-polished cavities in plates for liquid lenses.
Figure 14B:
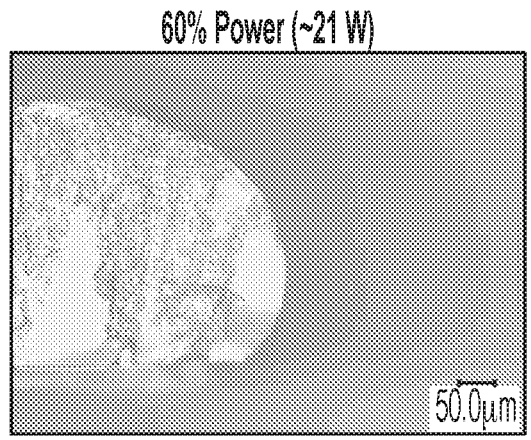
Figure 14C:
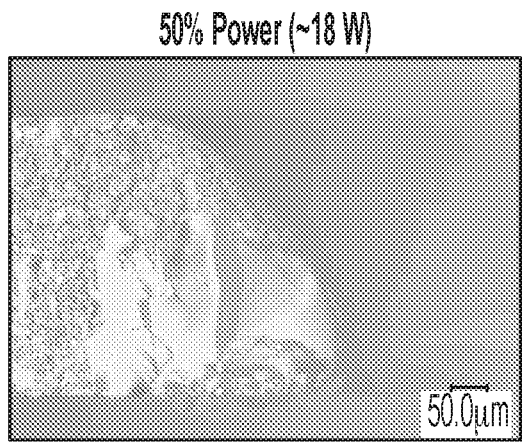
Figure 14D:
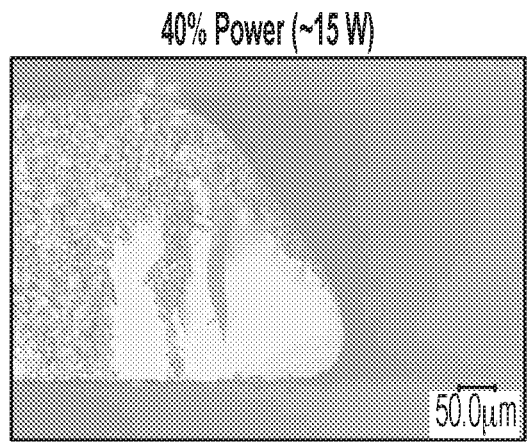
Figure 14E:
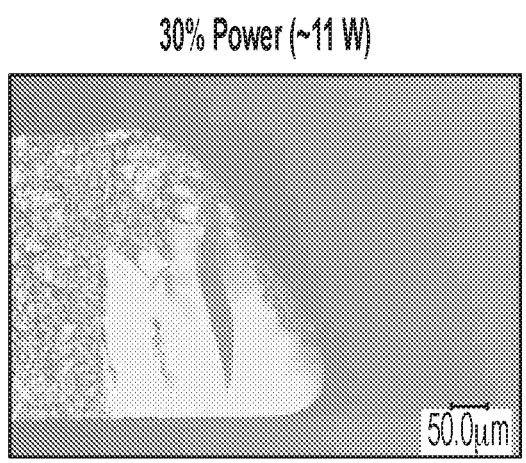
Figure 14F:
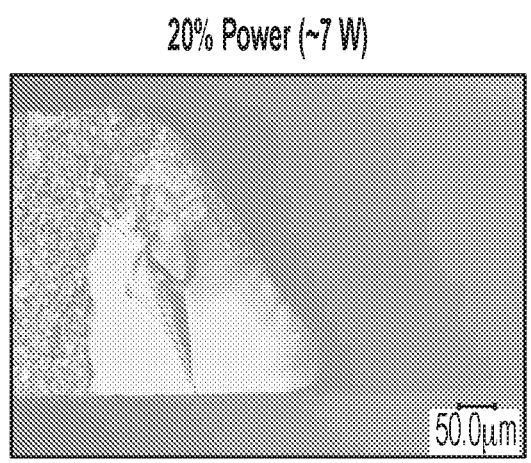

It should be noted, however, that FIG. 14A depicts a cavity, as formed according to a laser ablation process, but not subjected to any subsequent laser polishing. As shown in these figures, laser polishing, even at relatively low energies, can result in some non-uniformity in the sidewall of the cavity despite the significant improvement in its surface roughness. These non-uniformities, for example, can take on the shape of lumps or protrusions, particularly at the bottom edge of the sidewall (see, e.g., FIGS. 14E and 14F). Such non-uniformities, when present, can reduce the performance of the liquid lens by changing its operating characteristics that rely on the hysteresis of its immiscible liquids (e.g., first and second liquids 138, 139 shown in FIG. 1) within the cavity of the lens.

Figure 13B:
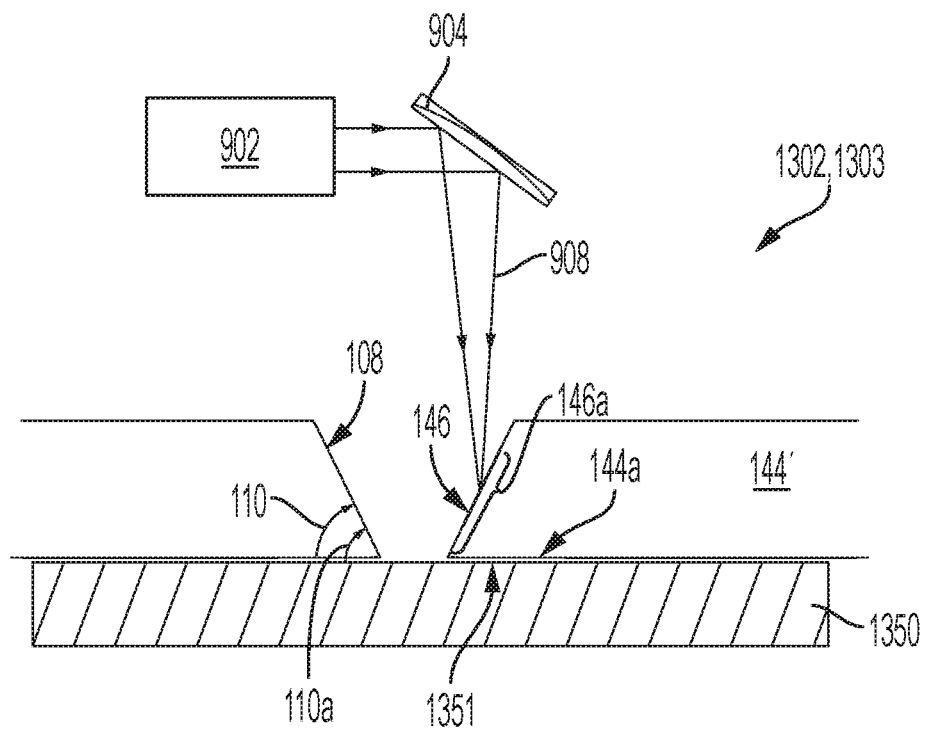
FIG. 13B is a cross-sectional schematic view of a cavity in a shaped plate according to embodiments of a method of laser polishing a cavity.
Figure 13C:
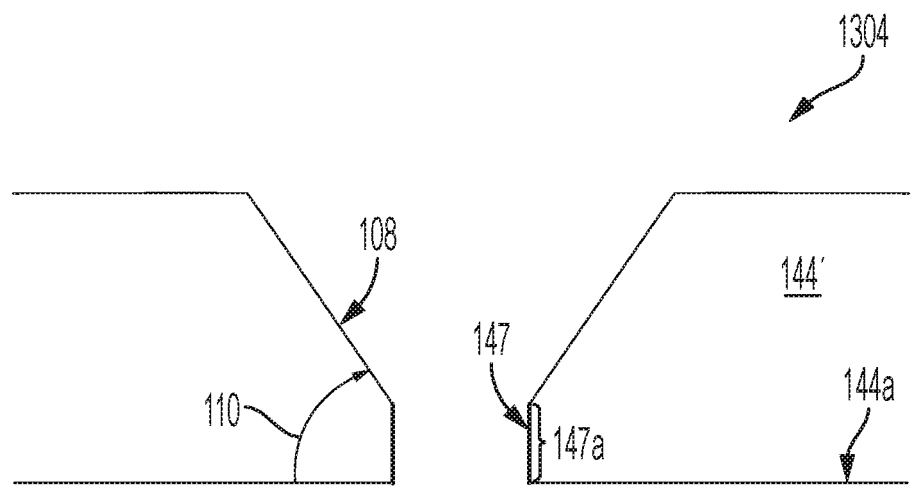
FIG. 13C is a cross-sectional schematic view of a cavity in a shaped plate according to embodiments of a method of laser polishing a cavity.
Figure 15A:
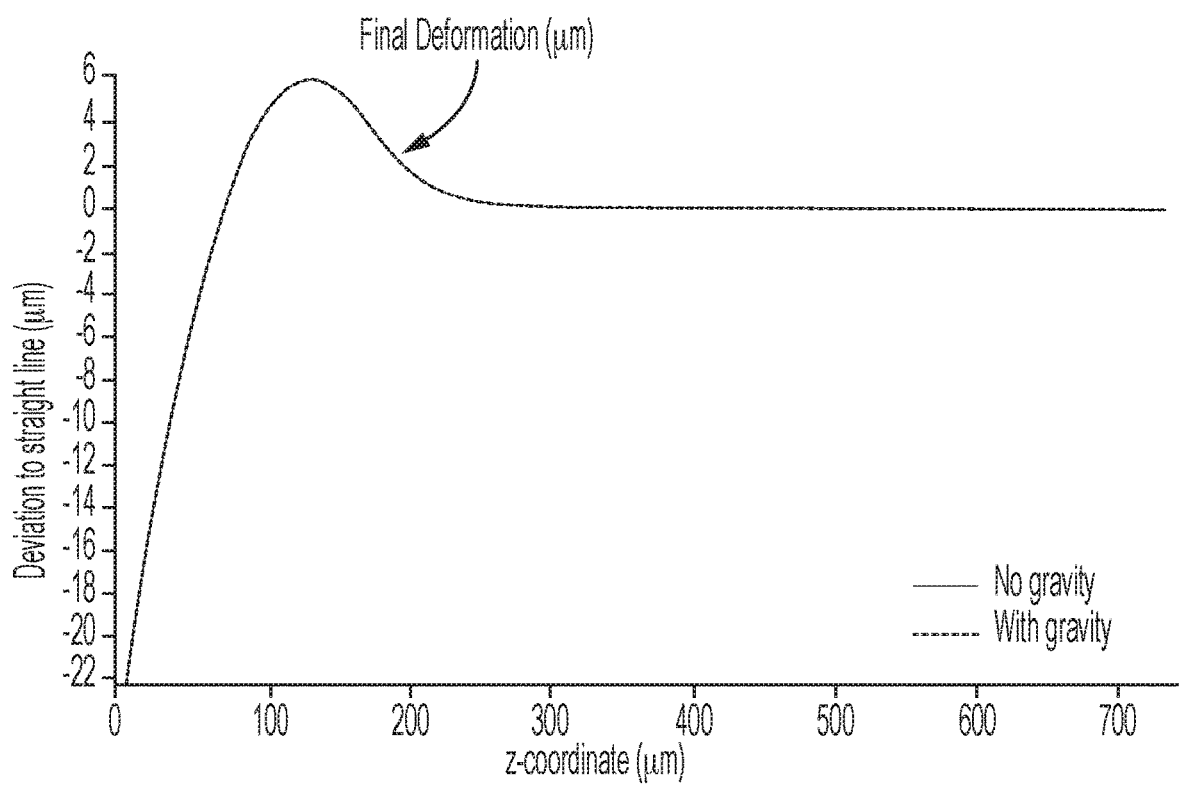
FIG. 15A is a schematic of the final deformation of a modeled sidewall of a cavity for a liquid lens, as exposed to a laser-polishing process with and without the influence of gravity.

Referring now to FIG. 15A, a schematic is provided of an as-modeled, final deformation of a sidewall of a cavity for a liquid lens that resulted from exposure to a laser-polishing process with and without the influence of gravity. As is evident from FIG. 15A, the model predicted a 5 μm lump that is formed at the inner diameter of the cavity (i.e., the bottom edge of the sidewall), independent of the effect of gravity. Hence, without being bound by theory, it is believed that this rounding and formation of a lump near the inner diameter of the cavity is primarily due to surface tension effects of the molten glass during the laser polishing process. Further, it is believed that the surface energies of the molten glass of the sidewall of the cavity and any surface in contact with the molten glass (e.g., a chuck 1350 as shown in FIG. 13B) drive or otherwise significantly influence the formation of these non-uniformities, as governed by the Young equation.

Figure 15B:
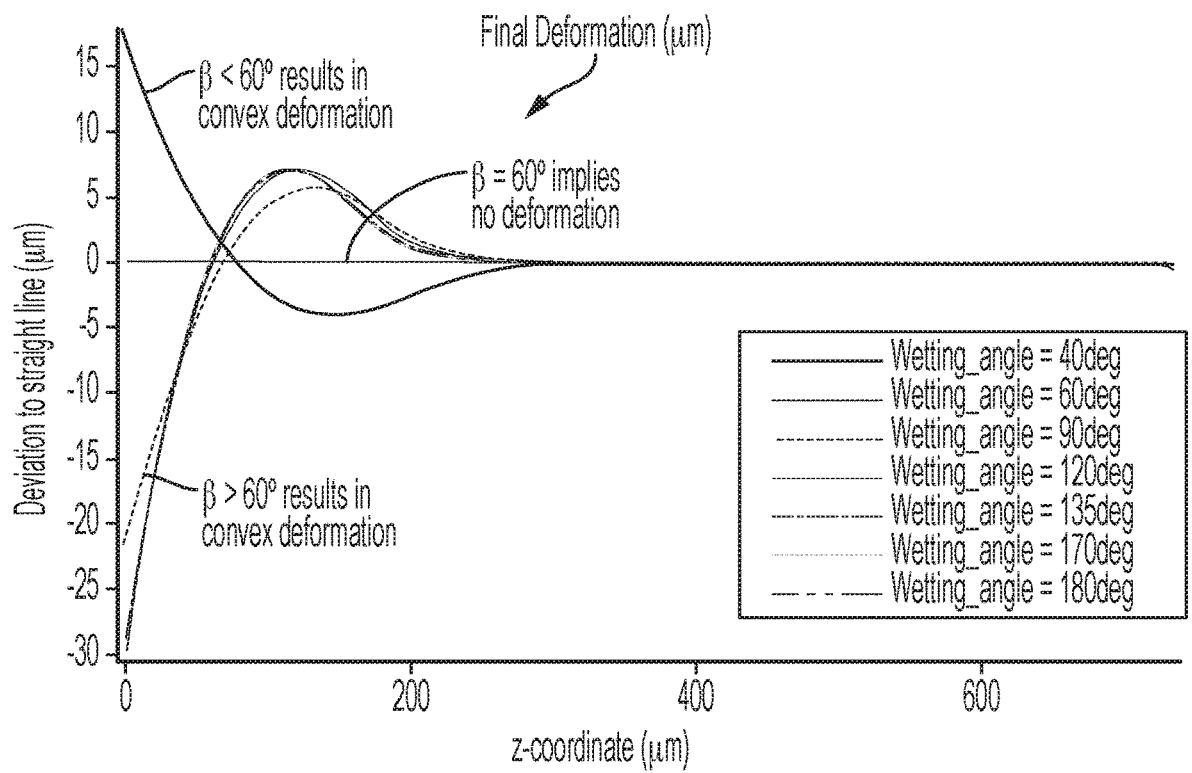
FIG. 15B is a schematic of the final deformation of a modeled sidewall of a cavity for a liquid lens as a function of various contact angles of the molten glass of the sidewall with a chuck beneath the cavity, as exposed to a laser-polishing process, according to an embodiment.

Referring now to FIG. 15B, a schematic is provided of an as-modeled final deformation of a sidewall of a cavity (as assuming a sidewall angle of 60 degrees) for a liquid lens as a function of various contact angles of the molten glass of the sidewall with a chuck beneath the cavity, as exposed to a laser-polishing process. Further, an assumption of the model is that the angle of the sidewall with respect to the base of the shaped plate is 60 degrees. As is evident from the figure, the contact angle formed between the molten glass of the sidewall and the underlying chuck significantly influences the degree of linearity observed in the sidewall upon completion of the laser polishing process. More particularly, the modeling depicted in FIG. 15B shows that if a molten sidewall of a shaped plate forms a contact angle of less than 60 degrees with an underlying chuck, surface tension of the molten glass will tend to cause a concave-shaped deformation. Conversely, if a molten sidewall of a shaped plate forms a contact angle of greater than 60 degrees with an underlying chuck, surface tension of the molten glass will tend to cause a convex-shaped deformation. Yet, if the molten sidewall of the shaped plate forms a contact angle of about 60 degrees with the chuck (i.e., as matching the angle of the sidewall itself), surface tension will tend to result in no deformation of the sidewall upon completion of the laser polishing process (see "ß=60)° implies no deformation" line series on FIG. 15B").

Accordingly, the modeling depicted in FIG. 15B shows that one can advantageously manipulate the final deformation of the sidewall of the cavity upon completion of the laser polishing process by modifying the surface energy of the sidewall and/or the underlying chuck. By controlling the surface energy of these elements, one can ensure that they form a wetting angle during the laser polishing process that substantially matches the angle of the sidewall itself. The net result is a sidewall with low surface roughness and a high degree of linearity. In some embodiments of the laser polishing methods of the disclosure, the contact angle of the molten sidewall can be modified by selection of the glass composition of the shaped plate and/or the composition of an underlying chuck or other element in contact with the sidewall during the laser polishing process. Other approaches to modifying the surface energies of these elements to improve sidewall linearity include modifying the surface energy of the surfaces of the shaped plate and/or an underlying chuck in contact with one another by use of an oxygen plasma treatment, as conducted according to principles understood by those of ordinary skill in the field of the disclosure. The surface energies of the sidewall surface, and the surfaces of the chuck in contact with it, can also be modified by applying additional texture, roughness and/or thin polymeric coatings to these surfaces prior to the laser polishing process.

Figure 16A:
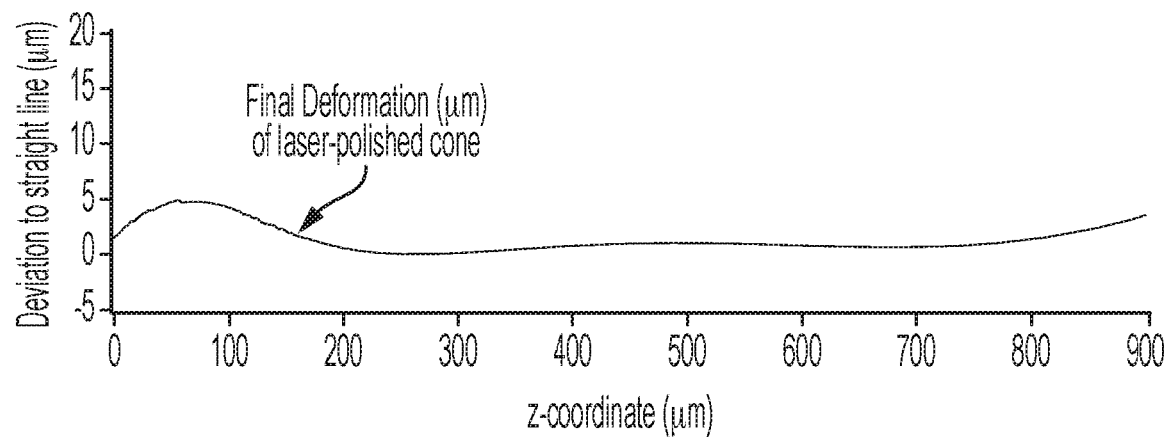
FIG. 16A is a plot of the final deformation of a sidewall of a cavity for a liquid lens, as exposed to a laser-polishing process.

Referring now to FIG. 16A, a plot is provided of the final deformation of a sidewall of a cavity for a liquid lens, as exposed to a laser-polishing process with no chuck. In FIG. 16A, the y-axis is positive and negative deformation of the sidewall relative to a straight line (i.e., at 0 microns) and the x-axis is the z-coordinate distance along the sidewall, from the bottom edge of the sidewall (at 0 microns) toward the top edge of the sidewall (at about 900 microns). As is evident from FIG. 16A and outlined earlier in connection with FIGS. 14A-14F and 15A, a laser polishing process conducted on a sidewall can result in an undesirable lump or protrusion in the bottom edge of the sidewall. As shown in FIG. 16A, the lump at the bottom edge of the sidewall is about 5 microns, essentially reducing the inner diameter of the cavity.

Figure 16B:
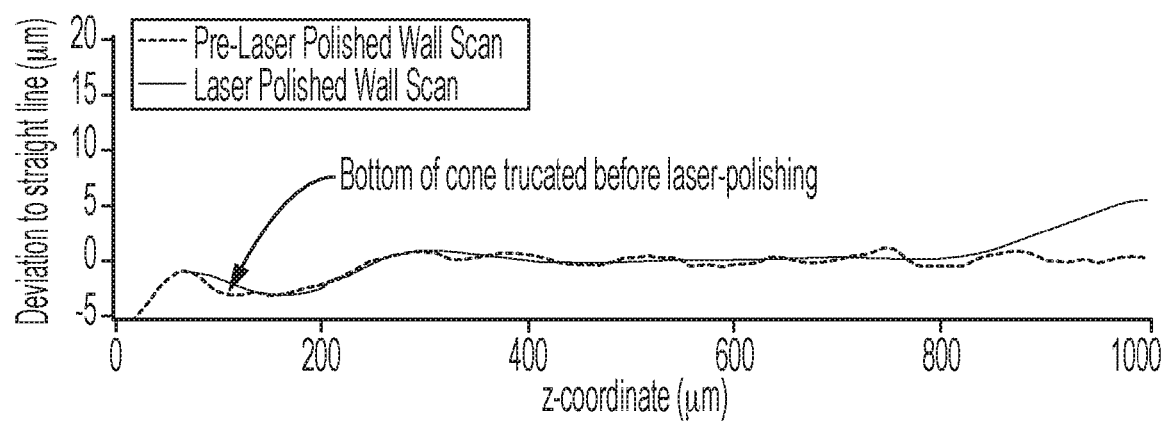
FIG. 16B is a plot of the profile of a truncated sidewall of a cavity prior to a laser-polishing process and a plot of the final deformation of the sidewall of the sample after exposure to a laser-polishing process, according to an embodiment.

Referring now to FIG. 16B, a dimensional profile is provided of a truncated sidewall of a cavity prior to a laser-polishing process ("pre-laser polished wall scan") and a plot is provided of the final deformation of the sidewall of the sample after exposure to a laser-polishing process ("laser polished wall scan"). It is first evident from the data in FIG. 16B that the sidewall was truncated about 200 microns prior to laser-polishing. It is also evident from the data in FIG. 16B that the truncated sidewall had the effect of influencing the final linearity of the sidewall after completion of the laser-polishing step. In particular, the profile of the laser-polished sample mirrors the profile of the sample with a truncated sidewall in a state prior to laser-polishing.

Figure 16C:
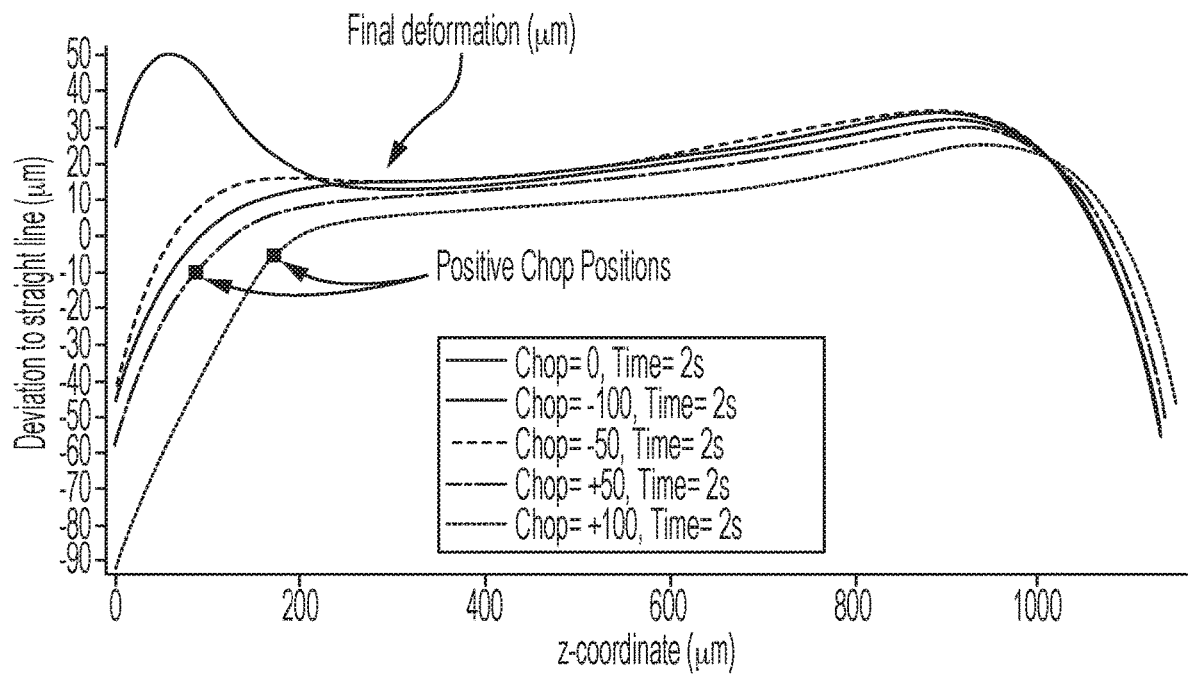
FIG. 16C is a schematic of the final deformation of a modeled sidewall of a cavity for a liquid lens as a function of various sidewall truncations, as exposed to a laser-polishing process, according to an embodiment.
Figure 16C:
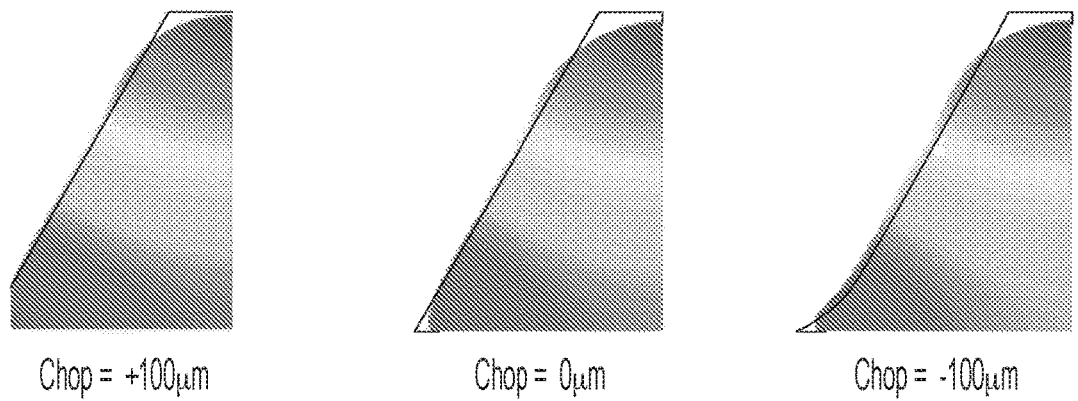

Further, the modeling depicted in FIG. 16C is consistent with the results of FIG. 16B. In particular, FIG. 16C is a schematic of the final deformation of a modeled sidewall of a cavity for a liquid lens as a function of various sidewall truncations, as exposed to a laser-polishing process. In FIG. 16C, the bottom left-hand portion shows a cross-section of a sidewall having a positive chop of about 100 μm, which means that the inner diameter of the cavity at its base has been increased by 100 μm. Accordingly, a portion of the sidewall is truncated to a particular length, as determined by the magnitude of the chop and the angle of the sidewall (e.g., as comparable to the second bottom portion length 147a shown in FIG. 13C). Also in FIG. 16C, the bottom center portion shows a cross-section of a sidewall having no chop, which means that the inner diameter of the cavity has not been changed. In addition, the bottom right-hand portion of FIG. 16C shows a cross-section of a sidewall having a negative chop (i.e., a protrusion) of about 100 μm, which means that the inner diameter of the cavity at its base has been decreased by 100 μm in forming a protrusion. Further, the top portion of FIG. 16C depicts the results of modeling these conditions, along with sidewalls having a positive and negative chop of about 50 μm. Ultimately, the modeling results from FIG. 16C demonstrate that the sidewalls with a positive chop of about 50 μm and 100 μm (labeled "positive chop positions") effectively blunts the rounding observed in laser-polished samples.

While exemplary embodiments and examples have been set forth for the purpose of illustration, the foregoing description is not intended in any way to limit the scope of disclosure and appended claims. Accordingly, variations and modifications may be made to the above-described embodiments and examples without departing substantially from the spirit and various principles of the disclosure. All such modifications and variations are intended to be included herein within the scope of this disclosure and protected by the following claims.

According to a first aspect, a liquid lens is provided. The liquid lens includes: a lens body comprising a first window, a second window, and a cavity disposed between the first window and the second window; and a first liquid and a second liquid within the cavity of the lens body, the first liquid and the second liquid substantially immiscible with each other and having different refractive indices such that an interface between the first liquid and the second liquid forms a lens. A sidewall of the cavity has an average surface roughness ($R_a$) of less than or equal to 20 nanometers (nm). The cavity is disposed within a shaped plate. Further, each of the windows and the plate comprises a glass, glass-ceramic or ceramic composition.

According to a second aspect, the first aspect is provided, wherein the cavity has a truncated conical shape.

According to a third aspect, the second aspect is provided, wherein the sidewall of the cavity is further defined by an angle of about 45 degrees to about 90 degrees between the sidewall and a base of the shaped plate.

According to a fourth aspect, any one of the first through third aspects is provided, wherein the sidewall of the cavity has an average surface roughness ($R_a$) of less than or equal to 10 nanometers (nm).

According to a fifth aspect, any one of the first through third aspects is provided, wherein the sidewall of the cavity has an average surface roughness ($R_a$) of less than or equal to 1 nanometer (nm).

According to a sixth aspect, any one of the first through fifth aspects is provided, wherein the cavity further comprises an azimuthal symmetry given by a maximum deviation (X) of up to 5 μm with regard to surface roughness ($R_a$) and cavity cross-sectional shape.

According to a seventh aspect, any one of the first through fifth aspects is provided, wherein the cavity further comprises an azimuthal symmetry given by a maximum deviation (X) of up to 1 μm with regard to surface roughness ($R_a$) and cavity cross-sectional shape.

According to an eighth aspect, any one of the first through seventh aspects is provided, wherein the glass composition of the plate comprises a coefficient of thermal expansion from $3\times10^{-6}/°$ K to $10\times10^{-6}/°$ K.

According to a ninth aspect, any one of the first through eighth aspects is provided, wherein a linearity of a first bottom portion of the sidewall in proximity to the base of the shaped plate is from 0 μm to ±5 μm.

According to a tenth aspect, any one of the first through eighth aspects is provided, wherein a linearity of a first bottom portion of the sidewall in proximity to the base of the shaped plate is from 0 μm to ±2.5 μm.

According to an eleventh aspect, either of the ninth or tenth aspects is provided, wherein the first bottom portion of the sidewall extends from the base of the shaped plate to a first bottom portion length that is within 500 μm of the base of the shaped plate.

According to a twelfth aspect, a method of polishing a cavity in a plate for a liquid lens is provided. The method includes: directing a laser beam from a laser against a sidewall of a cavity in a shaped plate. The directing is conducted to polish the sidewall to an average surface roughness ($R_a$) of less than or equal to 20 nanometers (nm). The plate comprises a glass composition. The sidewall of the cavity is further defined by an angle of about 45 degrees to about 90 degrees between the sidewall and a base of the shaped plate. Further, the laser comprises a power of less than 100 W.

According to a thirteenth aspect, the twelfth aspect is provided, wherein the laser beam is a circularly polarized beam.

According to a fourteenth aspect, either of the twelfth or thirteenth aspects is provided, wherein the directing is conducted to polish the sidewall of the cavity to an average surface roughness ($R_a$) of less than or equal to 10 nanometers (nm).

According to a fifteenth aspect, either of the twelfth or thirteenth aspects is provided, wherein the directing is conducted to polish the sidewall of the cavity to an average surface roughness ($R_a$) of less than or equal to 1 nanometer (nm).

According to a sixteenth aspect, any one of the twelfth through fifteenth aspects is provided, wherein the directing is further conducted to polish the sidewall of the cavity such that the sidewall further comprises an azimuthal symmetry given by a maximum deviation (X) of up to 5 μm with regard to surface roughness ($R_a$) and cavity cross-sectional shape.

According to a seventeenth aspect, any one of the twelfth through fifteenth aspects is provided, wherein the directing is further conducted to polish the sidewall of the cavity such that the sidewall further comprises an azimuthal symmetry given by a maximum deviation (X) of up to 1 μm with regard to surface roughness ($R_a$) and cavity cross-sectional shape.

According to an eighteenth aspect, any one of the twelfth through seventeenth aspects is provided, wherein the glass composition of the plate comprises a coefficient of thermal expansion from $3\times10^{-6}/°$ K to $10\times10^{-6}/°$ K.

According to a nineteenth aspect, a method of polishing a cavity in a plate for a liquid lens is provided. The method includes: directing a laser beam from a laser against a sidewall of a cavity in a shaped plate. The directing is conducted to polish the sidewall to an average surface roughness ($R_a$) of less than or equal to 20 nanometers (nm). The plate comprises a glass composition. The sidewall of the cavity is further defined by an angle of about 45 degrees to about 90 degrees between the sidewall and a base of the shaped plate The laser comprises a power of less than 100 W. Further, the directing is conducted to polish the sidewall such that a linearity of a first bottom portion of the sidewall in proximity to the base of the shaped plate is from 0 μm to ±5 μm.

According to a twentieth aspect, the nineteenth aspect is provided, wherein the directing is conducted to polish the sidewall of the cavity to an average surface roughness ($R_a$) of less than or equal to 10 nanometers (nm).

According to a twenty-first aspect, the nineteenth aspect is provided, wherein the directing is conducted to polish the sidewall of the cavity to an average surface roughness ($R_a$) of less than or equal to 1 nanometer (nm).

According to a twenty-second aspect, any one of the nineteenth through twenty-first aspects is provided, wherein the first bottom portion of the sidewall extends from the base of the shaped plate to a first bottom portion length that is within 500 μm of the base of the shaped plate.

According to a twenty-third aspect, any one of the nineteenth through twenty-second aspects is provided, wherein the directing step is further conducted with a top surface of a chuck beneath and in contact with the base of the shaped plate, and further wherein the angle between the sidewall and the base of the shaped plate and a contact angle formed by molten glass from the sidewall and the top surface of the chuck are within 10 degrees of each other.

According to a twenty-fourth aspect, the twenty-third aspect is provided, as further comprising: selecting a composition of the chuck, wherein the surface energy of the composition of the chuck and the surface energy of the glass composition of the plate are within 25% of each other.

According to a twenty-fifth aspect, any one of the nineteenth through twenty-second aspects is provided, as further comprising: truncating a second bottom portion of the sidewall of the cavity of the shaped plate, wherein an angle between the second bottom portion of the sidewall and the base of the shaped plate is about 90 degrees, and further wherein the step of truncating is conducted before the step of directing a laser beam.

According to a twenty-sixth aspect, the twenty-fifth aspect is provided, wherein the second bottom portion of the sidewall extends from the base of the plate to a second bottom portion length that is about 100 µm±25 µm.

According to a twenty-seventh aspect, a method of making a cavity in a plate for a liquid lens is provided. The method includes: directing a first laser beam from a first laser against a preform to ablate a cavity within the preform and define a shaped plate comprising the cavity: directing a second laser beam from a second laser against a sidewall of the cavity in the shaped plate. The directing a second laser beam is conducted to polish the sidewall to an average surface roughness ($R_a$) of less than or equal to 20 nanometers (nm). The plate comprises a glass composition. The sidewall of the cavity is further defined by an angle of about 45 degrees to about 90 degrees between the sidewall and a base of the shaped plate. The second laser comprises a power of less than 100 W.

According to a twenty-eighth aspect, the twenty-seventh aspect is provided, wherein the directing a second laser beam is conducted to polish the sidewall such that a linearity of a first bottom portion of the sidewall in proximity to the base of the shaped plate is from 0 µm to ±5 µm.

According to a twenty-ninth aspect, either of the twenty-seventh or twenty-eighth claim is provided, wherein the first bottom portion of the sidewall extends from the base of the shaped plate to a first bottom length that is within 500 µm of the base of the shaped plate.

According to a thirtieth aspect, any one of the twenty-seventh through twenty-ninth aspects is provided, wherein the linearity of the first bottom portion is from 0 µm to ±2.5 µm.

What is claimed is:

1. A method of polishing a cavity in a plate, comprising:
    directing a laser beam from a laser against a sidewall of a cavity in a shaped plate;
    wherein the directing is conducted to polish the sidewall to an average surface roughness (Ra) of less than or equal to 20 nanometers (nm);
      wherein the plate comprises a glass composition;
      wherein the sidewall of the cavity is further defined by an angle of about 45 degrees to about 90 degrees between the sidewall and a base of the shaped plate;
      wherein the laser comprises a power of less than 100 W;
    wherein the directing is further conducted to polish the sidewall of the cavity such that the sidewall further comprises an azimuthal symmetry given by a maximum deviation (X) of up to 5 µm with regard to cavity cross-sectional shape;
    wherein, the directing step is conducted with a top surface of a chuck beneath and in contact with the base of the shaped plate; and wherein, the angle between the sidewall and the base of the shaped plate and a contact angle formed by molten glass from the sidewall and the top surface of the chuck are within 10 degrees of each other.

2. The method according to claim 1, wherein the laser beam is a circularly polarized beam.

3. The method according to claim 1, wherein the directing is conducted to polish the sidewall of the cavity to an average surface roughness ($R_a$) of less than or equal to 10 nanometers (nm).

4. The method according to claim 1, wherein the directing is conducted to polish the sidewall of the cavity to an average surface roughness ($R_a$) of less than or equal to 1 nanometer (nm).

5. The method according to claim 1, wherein the directing is further conducted to polish the sidewall of the cavity such that the sidewall further comprises an azimuthal symmetry given by a maximum deviation (X) of up to 1 µm with regard to cavity cross-sectional shape.

6. The method according to claim 1, wherein the glass composition of the plate comprises a coefficient of thermal expansion from $3 \times 10^{-6}/°$ K to $10 \times 10^{-6}/°$ K.

7. A method of polishing a cavity in a plate, comprising:
    directing a laser beam from a laser against a sidewall of a cavity in a shaped plate;
    wherein the directing is conducted to polish the sidewall to an average surface roughness ($R_a$) of less than or equal to 20 nanometers (nm);
    wherein the plate comprises a glass composition;
    wherein the sidewall of the cavity is further defined by an angle of about 45 degrees to about 90 degrees between the sidewall and a base of the shaped plate;
    wherein the laser comprises a power of less than 100 W;
    wherein the directing is conducted to polish the sidewall such that a linearity of a first bottom portion of the sidewall in proximity to the base of the shaped plate is from 0 µm to ±5 µm;
    wherein the first bottom portion of the sidewall extends to a first bottom portion length, the first bottom portion length defined from the base of the shaped plate to less than or equal to 500 µm from the base of the shaped plate;
    the directing step is conducted with a top surface of a chuck beneath and in contact with the base of the shaped plate; and
    the angle between the sidewall and the base of the shaped plate and a contact angle formed by molten glass from the sidewall and the top surface of the chuck are within 10 degrees of each other.

8. The method according to claim 7, wherein a surface energy of a composition of the chuck and a surface energy of the glass composition of the plate are within 25% of each other.

9. A method comprising:
    truncating a second bottom portion of a sidewall of a cavity of a shaped plate; and
    directing a laser beam from a laser against the sidewall of the cavity in the shaped plate;

wherein the directing is conducted to polish the sidewall to an average surface roughness ($R_a$) of less than or equal to 20 nanometers (nm);

wherein the plate comprises a glass composition;

wherein the sidewall of the cavity is further defined by an angle of about 45 degrees to about 90 degrees between the sidewall and a base of the shaped plate;

wherein the laser comprises a power of less than 100 W;

wherein the directing is conducted to polish the sidewall such that a linearity of a first bottom portion of the sidewall in proximity to the base of the shaped plate is from 0 μm to ±5 μm;

wherein the first bottom portion of the sidewall extends to a first bottom portion length, the first bottom portion length defined from the base of the shaped plate to less than or equal to 500 μm from the base of the shaped plate;

wherein an angle between the second bottom portion of the sidewall and the base of the shaped plate is about 90 degrees; and wherein the step of truncating is conducted before the step of directing a laser beam.

10. The method according to claim 9, wherein the second bottom portion of the sidewall extends from the base of the plate to a second bottom portion length that is about 100 μm±25 μm.

11. A method of making a cavity in a plate, comprising:
directing a first laser beam from a first laser against a preform to ablate a cavity within the preform and define a shaped plate comprising the cavity; and
polishing the cavity using the method according to claim 1.

12. The method according to claim 11, wherein a linearity of a first bottom portion of the sidewall in proximity to the base of the shaped plate is from 0 μm to ±5 μm.

13. The method according to claim 1, wherein the directing is conducted to polish the sidewall such that a linearity of a first bottom portion of the sidewall in proximity to the base of the shaped plate is from 0 μm to ±5 μm.

* * * * *